United States Patent
Hattori

(10) Patent No.: US 7,295,348 B2
(45) Date of Patent: Nov. 13, 2007

(54) PROCESSOR FOR IMAGE PROCESSING, METHOD OF PROCESSING IMAGE USING THE SAME, AND PRINTER INCORPORATING THE SAME

(75) Inventor: Toshiyuki Hattori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 998 days.

(21) Appl. No.: 10/291,758

(22) Filed: Nov. 12, 2002

(65) Prior Publication Data

US 2003/0123093 A1 Jul. 3, 2003

(30) Foreign Application Priority Data

Nov. 12, 2001 (JP) ............................ P2001-346621
Jun. 11, 2002 (JP) ............................ P2002-169578

(51) Int. Cl.
*H04N 1/405* (2006.01)
(52) U.S. Cl. ..................................... 358/3.14; 358/3.21
(58) Field of Classification Search ................. 358/1.9, 358/2.1, 3.14–3.16, 3.11–3.12, 3.2–3.22, 358/521, 534–536
See application file for complete search history.

(56) References Cited

U.S. PATENT DOCUMENTS

| 4,595,956 A | * | 6/1986 | Kawamura et al. | ........ | 358/3.17 |
| 5,252,959 A | * | 10/1993 | Kono | ........................ | 345/694 |
| 7,009,737 B2 | * | 3/2006 | Morimatsu | ................. | 358/3.14 |

FOREIGN PATENT DOCUMENTS

| JP | 06311368 A | * | 11/1994 |
| JP | 2002016802 A | * | 1/2002 |

* cited by examiner

Primary Examiner—Thomas D. Lee
Assistant Examiner—Stephen Brinich
(74) Attorney, Agent, or Firm—Sughrue Mion, PLLC

(57) ABSTRACT

There is generated a virtual tile set which virtually covers color planes of an original image without any clearance or overlap by combination of Penrose-type virtual tiles to be non-periodically provided on the planes. The respective tiles are subjected to raster conversion in accordance with predetermined gradation levels, thereby generating a raster image. Since the virtual tiles can be laid non-periodically, iteration of the same dot pattern on the raster image can be prevented.

8 Claims, 23 Drawing Sheets

SUN

STAR

ACE

DEUCE

JACK

QUEEN

KING

GRADATION LEVEL 0

GRADATION LEVEL 1

GRADATION LEVEL 2

GRADATION LEVEL 3

GRADATION LEVEL 4

GRADATION LEVEL 5

GRADATION LEVEL 6

GRADATION LEVEL 7

GRADATION LEVEL 8

GRADATION LEVEL 9

GRADATION LEVEL 10

GRADATION LEVEL 11

GRADATION LEVEL 12

GRADATION LEVEL 13

GRADATION LEVEL 14

GRADATION LEVEL 15

GRADATION LEVEL 16

GRADATION LEVEL 17

PROCESSOR FOR IMAGE PROCESSING, METHOD OF PROCESSING IMAGE USING THE SAME, AND PRINTER INCORPORATING THE SAME

BACKGROUND OF THE INVENTION

The invention relates to an image processor and an image processing method used for image processing such as halftoning, which is used for generating an electrophotograph by use of, e.g., a color laser printer.

Depending on the type of a print engine, limitations are generally imposed on the number of colors (CMYK or CMY) and the number of levels of gradation (e.g., two levels of gradation), which are available in a color laser printer. For this reason, difficulty is encountered in faithfully regenerating, in the form of printed matter, a natural color image having continuous multiple gradations; e.g., a photograph.

For this reason, aggregates of minute dots have hitherto been used to artificially represent multiple gradations and colors, thereby creating an optical illusion for a person viewing the printed matter. In relation to the optical illusion, the greater the number of dots provided in a certain small area, the greater the apparent density of the entire small area. Conversely, the smaller the number of dots decreases, the lower the apparent density of the small area. Similarly, print areas of respective print colors; that is, CMY or CMYK, are adjusted by utilization of the optical illusion, whereby the number of colors is artificially increased through use of limited print colors, thus regenerating colors of an original image.

In this way, a method for artificially increasing the number of colors by adjustment of print areas of respective colors over a wider region or expressing multiple gradations in the form of dot areas is called an areal gradation method. A dithering technique and an error diffusion technique, for example, have been known as embodiments of the areal gradation method.

When the areal gradation method is used for converting, e.g., a gray-scale image having multiple gradations into a black-and-white binary image, an original image is divided into blocks of predetermined shapes (halftone cells). The thus-divided pieces of images are subjected to binary-encoding in the respective blocks. However, there may arise a case where, when color planes employing blocks of the same shapes are superimposed one on another, interference, known as moiré fringes, appear between patterns.

In particular, according to the dithering method, the entire original image is divided through use of blocks of identical shape; e.g., a rectangular shape of fixed size. Further, the respective blocks have the same layout of dithering threshold levels. Therefore, when the blocks are rasterized, identical patterns are likely to appear recursively. When color planes having the same raster patterns are superimposed one on another, moiré fringes may appear. For this reason, the chance of occurrence of moiré fringes is reduced by adjusting the directions in which blocks are arranged in the respective color planes (i.e., screen angles).

By way of an example, the darkest (black (K)) plane is placed at an angle of 45°; a cyan (C) plane is placed to cross the black (K) plane at an angle of 30° (i.e., 15°); a magenta (M) plane is placed to cross the black (K) plane at an angle of 30° (75°); and a visually-inconspicuous yellow (Y) plane is placed at an angle of 0° (i.e., an intermediate position between the cyan (C) plane and the magenta (M) plane, because an angle of 75° is equal to an angle of −15°).

However, difficulty is encountered in superimposing colors of print planes at accurate angles. In particular, in the case of a so-called tandem color laser printer equipped with print engines for respective colors, the printer encounters difficulty in improving the accuracy of registration of colors (i.e., a color registration), because of its principle. For this reason, adjustment of screen angles is limited in its effectiveness in lessening moiré fringes.

According to the error diffusion technique, errors are distributed over all pixels such that accumulated errors arising between original pixels and analogous pixels become zero. Hence, in contrast with the dithering technique, the error diffusion technique has no periodicity and is less likely to generate a moiré fringe. However, minute dots (in particular, isolated dots) of an electrophotograph are unstable. Hence, use of the error diffusion technique entails problems, such as instability of colors and a failure to ensure a large number of gradation levels.

SUMMARY OF THE INVENTION

It is therefore an object of the invention to provide a halftoning processor and a halftoning method which reduce occurrence of moiré fringes and enable expression of high-quality multiple gradations.

In order to achieve the above object, according to the invention, it is inhibited or prevented occurrence of a periodicity, which would otherwise arise during halftoning, by appropriate combination of a plurality of types of areal gradation arrays that differ in shape or size.

Specifically, in a halftone processor according to the invention, a storage stores therein a plurality of areal gradation arrays respectively having different shapes or sizes from one another; a coverage performer selects and combines ones of the areal gradation arrays to virtually cover an original image having multiple gradation levels with the selected and combined areal gradation arrays; and a gradation level determinant binarizes a gradation level of each pixel which is associated with one of the selected and combined areal gradation arrays, based on a setting value defined in each of the areal gradation arrays.

Here, the expression "a plurality of areal gradation arrays respectively having different shapes or sizes" includes a case where areal gradation arrays have the same shape but different sizes, as well as a case where areal gradation arrays have different shapes. The layout pattern of the setting values in each of the areal gradation arrays may be changed in accordance with shape or size, or the areal gradation arrays having the same shape or size may have setting values provided in different layout patterns.

Combined use of areal gradation arrays having different shapes or sizes prevents repeated appearance of the same pattern, thereby decreasing the occurrence of a moiré fringe.

Halftoning according to the invention includes a case where a multi-gradation image is converted into an image having a lower resolution of gradation; for example, a case where an original image having 256 gradation levels is output after having been converted into an image having 16 gradation levels, as well as a case where a multi-gradation image is binarized.

The coverage performer may select and combine the ones of the areal gradation arrays such that adjacent areal gradation arrays are made different from each other.

Alternatively, the coverage performer select and combine at least two kinds of the areal gradation arrays having different shapes.

According to the invention, there may be adopted a plurality of areal gradation arrays which are capable of non-periodically covering a plane without any overlap or clearance.

Although a Penrose tile is known as such a shape, the shape is not limited to the Penrose tile, so long as the shape enables non-periodic coverage of a plane.

According to the invention, the coverage performer divides a predetermined one of the selected and combined areal gradation arrays to cover the divided areal gradation array with a plurality of sub-areal gradation arrays.

Further, the coverage performer may adjust an areal density of the selected and combined areal gradation arrays in accordance with a frequency of the original image, such that a portion of the original image having a higher frequency is covered with a larger number of areal gradation arrays.

For instance, the coverage performer covers the inside of the areal gradation arrays with a larger number of areal gradation arrays when the size of an areal gradation array is larger than a predetermined value or when an areal gradation array having a relatively large area is allocated to a contour portion (i.e., an edge) where color or density changes abruptly. Here, when the inside of an areal gradation array is divided again, the areal gradation array should desirably be divided such that the chance of occurrence of a periodicity is minimized. When there is less probability of deterioration of image quality in terms of an entire image, a slight periodicity can be allowed.

Moreover, the halftoning processor may further comprise a model storage, which stores therein a predetermined model pattern which is composed of the areal gradation arrays. The coverage performer covers the original image by utilizing the model pattern.

Namely, there is predetermined in advance a model pattern which is composed of the areal gradation arrays. A model pattern is defragmented in accordance with the size of an original image to cover the surface of the original image with the areal gradation arrays.

Alternatively, the halftoning processor further comprise a reference pattern storage, which previously stores therein at least one size-based reference pattern which is composed of the areal gradation arrays according to at least one size of the original image. The coverage performer covers the original image with the areal gradation arrays based on the reference pattern.

For example, an original image can be quickly covered with areal gradation arrays by preparing reference patterns according to the size of an image; e.g., A4-size or A3-size.

In a case where an original image is a color image, the coverage performer may cover respective color planes constituting the original image with an identical set of the areal gradation arrays.

Alternatively, the coverage performer may cover respective color planes constituting the original image with different sets of the areal gradation arrays.

Still alternatively, the coverage performer may cover at least one of color planes constituting the original image with a set of the areal gradation arrays which is different from a set of the areal gradation arrays used for covering remaining one of the color planes.

Color planes of an RGB or CMYK color system can be covered with a combination of areal gradation arrays corresponding to characteristics of respective colors. For instance, areal gradation arrays are laid in a color plane (typically a yellow plane) which is less cognizable to human vision, with allowance of some periodicity. Conversely, a color plane which is more cognizable to human vision can be covered with areal gradation arrays so that no periodicity arises.

According to the invention, there is also provided a halftoning processor comprising a virtual tile storage, which previously stores therein a plurality of virtual tiles respectively having different shapes or sizes from one another.

Here, a virtual tile set generator selects and combines ones of the virtual tiles to generate a virtual tile set which is capable of covering each of color planes constituting the color original image with the selected and combined virtual tiles. A gradation level determinant, which determines a gradation level of each of the virtual tiles. A raster image generator converts each pixel which is associated with one of the selected and combined virtual tiles provided with the determined gradation level, into a raster image in accordance with characteristic of an image output device.

Here, the expression "in accordance with the characteristic of the image output device" means "in accordance with an expression method or performance of an image output device, such as a color laser printer or a liquid-crystal display." For instance, when the printing is performed by a color laser printer, a raster image is generated in the form of a square lattice.

Moreover, there may be employed a virtual tile specified so as to non-periodically cover a plane without any overlap or clearance.

The invention can be represented as a program to be used with a halftoning method or a halftoning processor. The program can be provided stationarily on any of various types of recording mediums; e.g., CD-ROM or a HDD, or distributed via a communication line.

The invention can also be represented as a printer, in particularly, an electrophotographic printer. Alternatively, the invention can be represented as a method of producing an electrophotographic printed matter or as a electrophotographic printed matter.

DETAILED DESCRIPTION OF THE PREFERRED EMBODIMENTS

First, a first embodiment of the invention will be described with reference to FIGS. 1 through 22.

Figure 1:
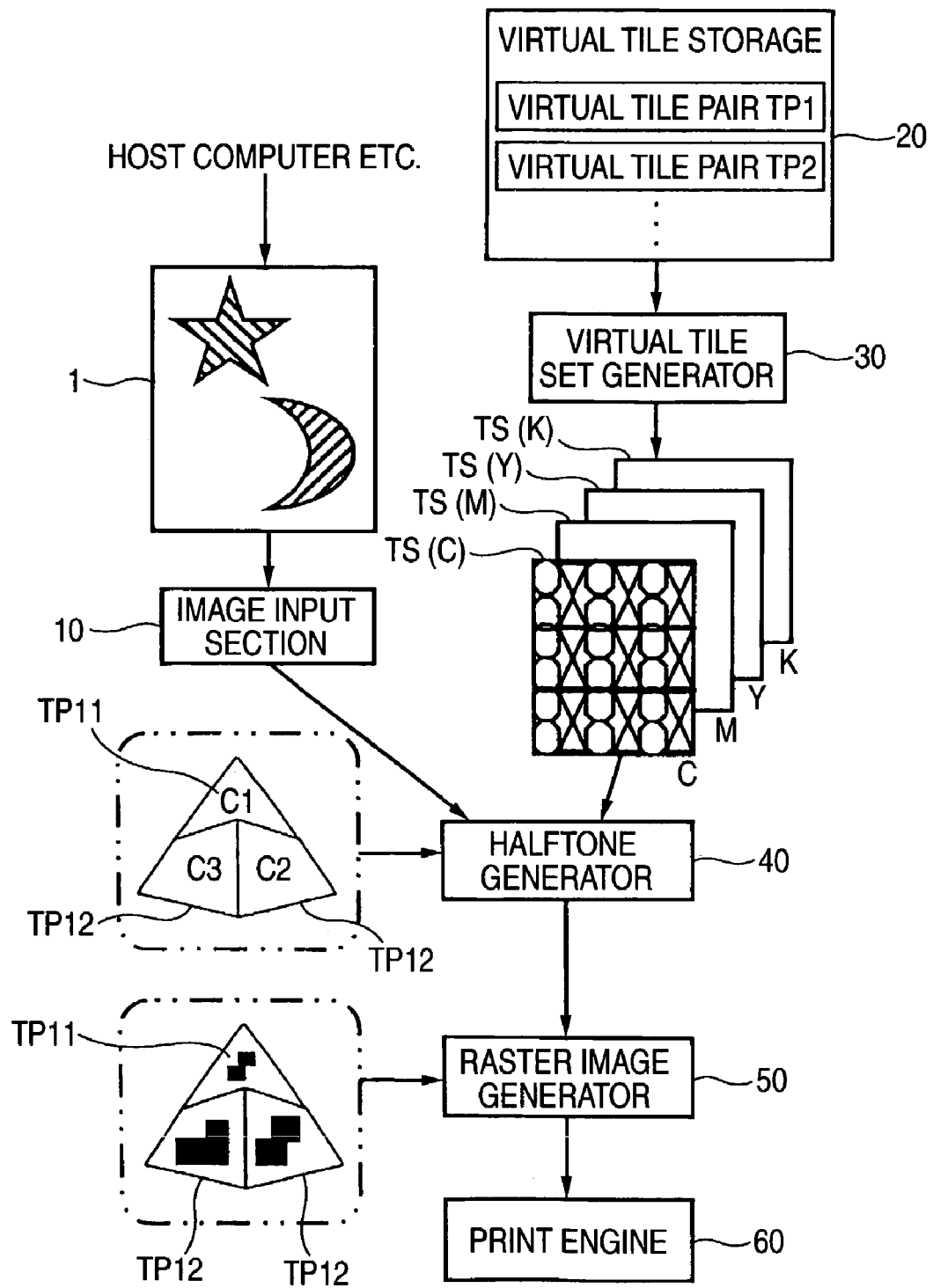
FIG. 1 is a block diagram of an image processor according to an embodiment of the invention.

As shown in FIG. 1, a halftoning processor has an image input section 10; a virtual tile storage 20; a virtual tile set generator 30; a halftone generator 40; and a raster image generator 50, which will be respectively described later in detail.

The image input section 10 receives and stores an original color image input by way of an unillustrated host computer or the like. The host computer can be, for instance, a workstation, a personal computer, a portable information terminal, a cellular phone, a digital camera, a scanner, or the like. Here, the image input section 10 can receive an original color image directly from an image recording medium; e.g., a PC card or a memory card, rather than from the host computer.

The virtual tile storage 20 is formed within a storage section; e.g., memory or a hard disk drive. At least one pair of virtual tile sets TP, which will be described later, is stored in the virtual tile storage 20.

The virtual tile set generator 30 generates a virtual tile set TS which covers color planes of the original image without involvement of a clearance, through use of a virtual tile set read from the virtual tile storage 20. As will be described later, each virtual tile set TS is formed from a plurality of virtual tiles to be used for covering the color planes without any overlap or clearance. The virtual tile set generator 30 of the embodiment generates the virtual tile set TS for each of color planes of a CMYK color system. In the drawings, alphabetical subscripts provided in parentheses appended to respective symbols TS indicate color planes.

Various methods can be adopted as a method for generating a virtual tile set. However, it will be described later in conjunction with virtual tile set generation processing.

After having converted the colors of the original color image input to the image input section 10, the halftone generator 40 determines gradation levels for respective virtual tiles of the color planes generated through color conversion. Through the color conversion processing, the original image expressed by, e.g., an RGB color system is converted into a CMYK color system for printing purpose.

The halftone generator 40 determines the densities (i.e., gradation levels) of the respective virtual tiles constituting the respective virtual tile sets, on the basis of the color planes generated after color conversion and the virtual tile sets for the respective color planes. A color conversion processor may be provided separately from the halftone generator 40.

In the drawing, a portion of virtual tiles for which gradation levels have been determined are shown in an area enclosed by a phantom line on the left side of the halftone generator 40. A gradation level of a virtual tile TP11 is set as C1; a gradation level of a right virtual tile TP12 is set as C2; and a gradation level of a left virtual tile TP12 is set as C3.

The raster image generator 50 converts respective virtual tiles into raster images in accordance with the gradation levels set for the respective virtual tiles. Specifically, when the print engine 60 is a color laser engine, a raster image is generated in the form of a square lattice. Since a raster image corresponds to the characteristics of the print engine 60, the print engine 60 can readily print a raster image.

With reference to FIGS. 2A through 2D, an example of the virtual tile will now be described. The drawing shows two sets of virtual tiles formed from two types of virtual tiles.

Figure 2A:
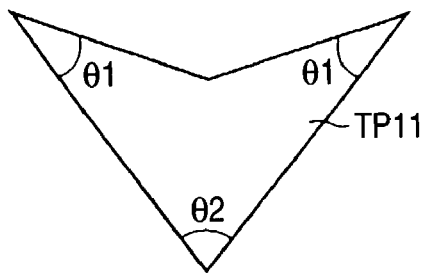
FIGS. 2A to 2D are descriptive views showing a virtual tile set of Penrose tile type.
Figure 2B:
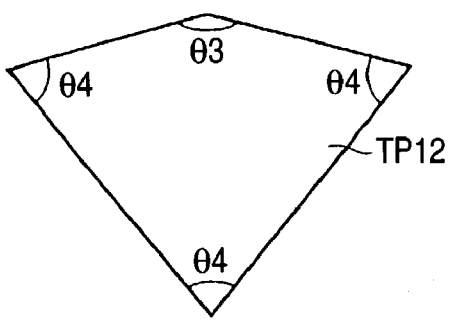

The virtual tile TP11 shown in FIG. 2A and the virtual tile TP12 shown FIG. 2B constitute a single set. Here, angles of the virtual tile TP11 and those of the virtual tile TP12 are set so that an area around a certain point can be covered with the tiles without any overlap or clearance. More specifically, $\theta 1=36°$, $\theta 2=72°$, $\theta 3=144°$, and $\theta 4=72°$.

Figure 2C:
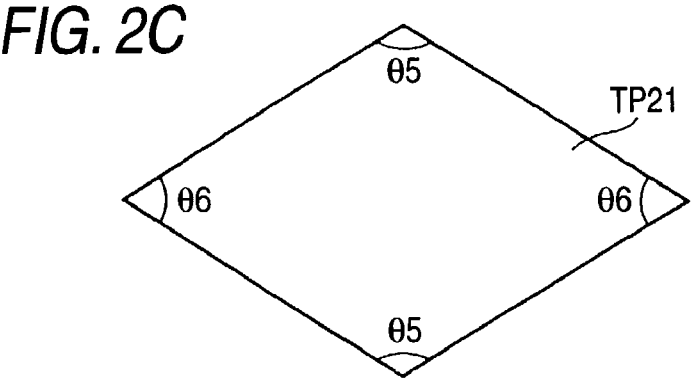
Figure 2D:
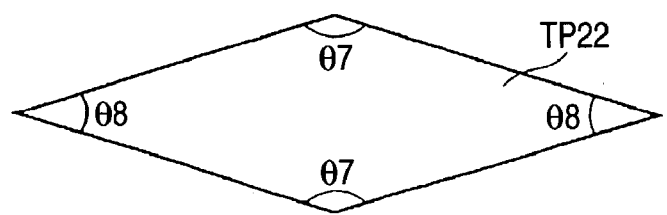

A virtual tile TP21 shown in FIG. 2C and a virtual tile TP22 shown in FIG. 2D constitute another set of tiles. In an analogous fashion, angles of the virtual tile TP21 and those of the virtual tile TP22 are set so that an area around a certain point can be covered with the tiles without any overlap or clearance. More specifically, $\theta 5=108°$, $\theta 6=72°$, $\theta 7=144°$, and $\theta 8=36°$.

In the following descriptions, explanations focus on the set formed from the virtual tiles TP11 and TP12. The tiles shown in the drawings are what are called Penrose tiles. Although the Penrose tiles are preferably used in the embodiment, the invention is not limited to these tiles. As will be described later, virtual tiles of other shapes, such as squares, can also be used.

Figure 3A:
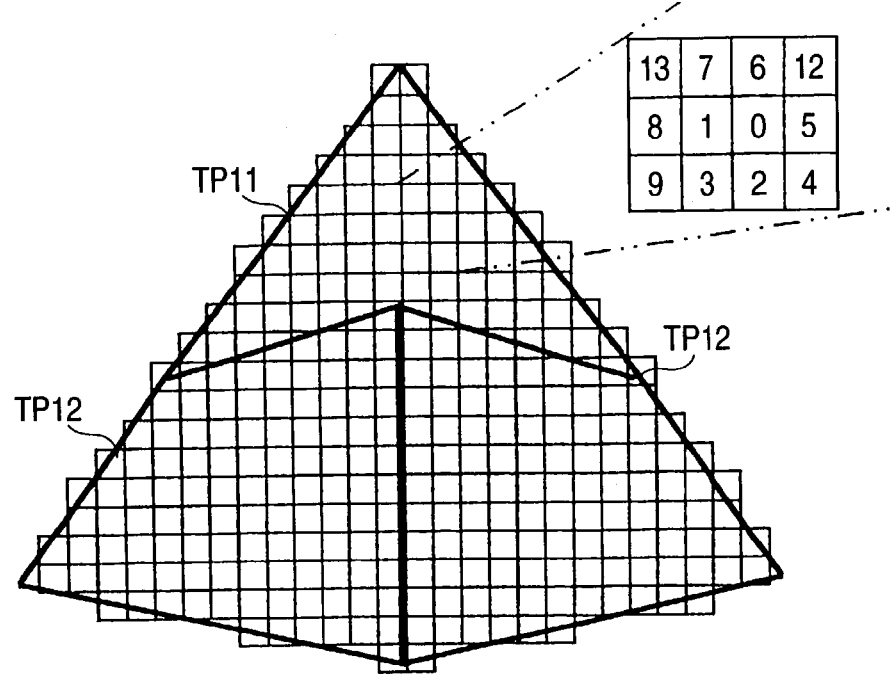
FIG. 3A is a descriptive view showing the layout of dithering threshold values set on a virtual tile.

As shown in FIG. 3A, dithering threshold values are allocated to the respective virtual tiles. The range of values that the dithering threshold values can assume changes according to the number of gradation levels. In a case where each of the virtual tiles expresses 64 gradation levels, dithering threshold values ranging from 0 to 63 are set in the virtual tiles.

Figure 3B:
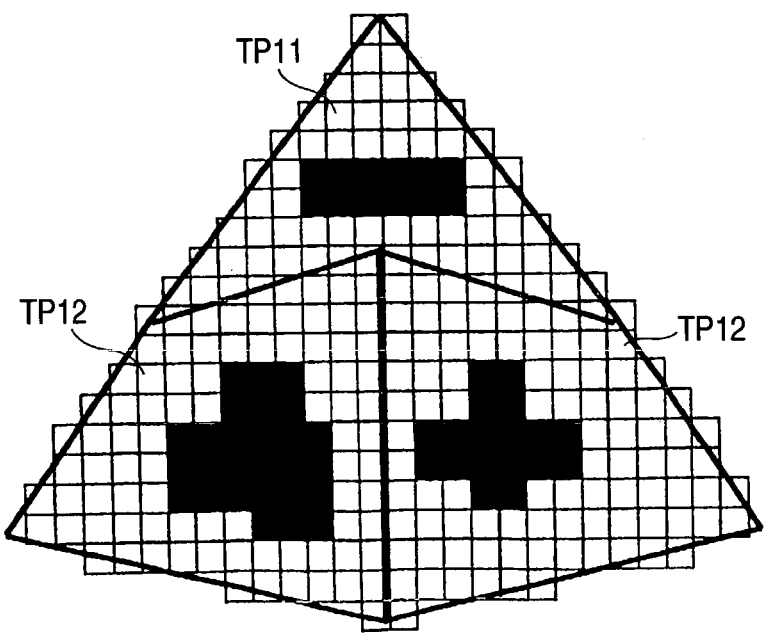
FIG. 3B is a descriptive view showing raster conversion.

As shown in FIG. 3B, pixels provided in the respective virtual tiles are binarized by comparison between the gradation levels of respective pixels of the original image and dithering threshold values. As a result, a raster image is generated.

Figure 4A:
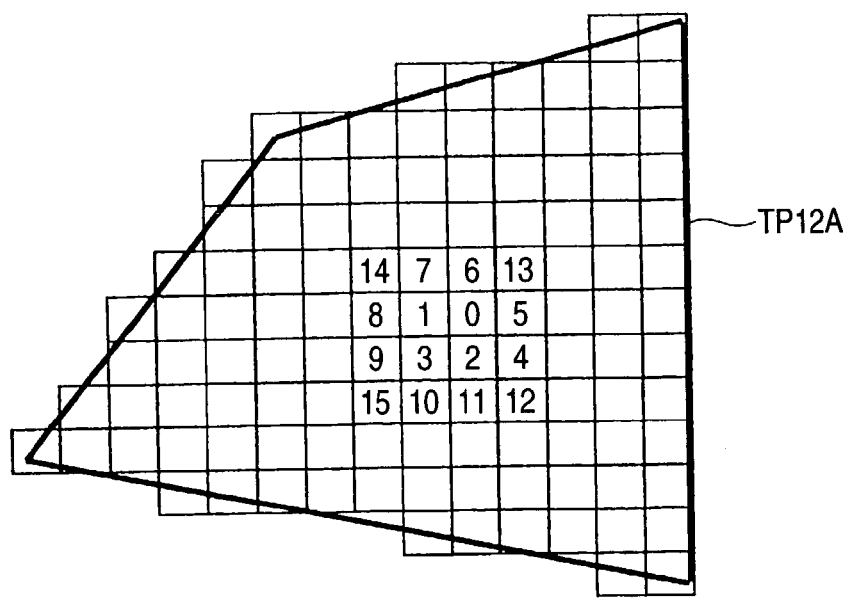
FIGS. 4A and 4B are descriptive views showing a state in which different structures are embodied by application of different layouts of dithering values to virtual tiles having the same shape.
Figure 4B:
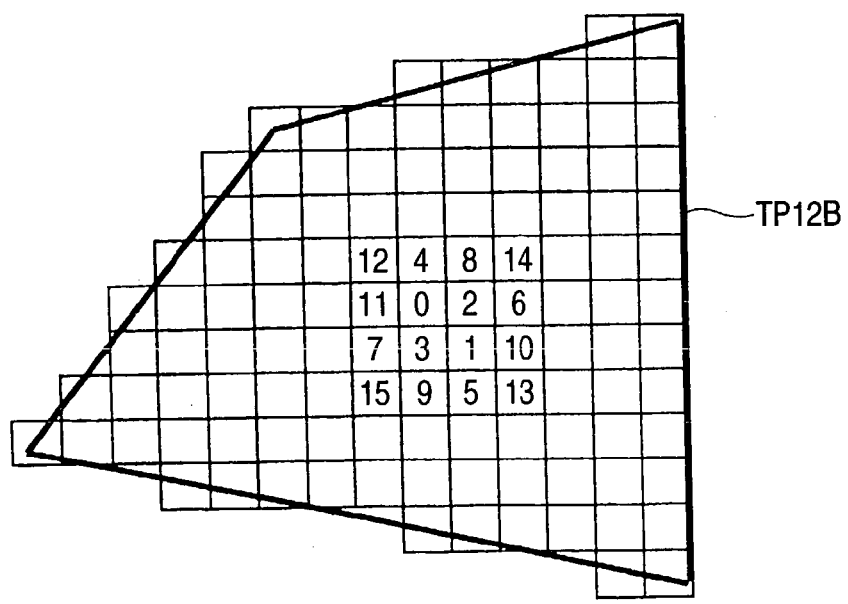

For instance, the known layout of dithering threshold values includes a Bayer type, a Screw type, a halftone type, and others. The same layout of dithering threshold values is applied to virtual tiles having the same shape used in a certain color plane. Even in the case where virtual tiles have the same shape, if the tiles are used for different color planes, the layout of dithering threshold values may be changed from one color plane to another color plane. As shown in FIGS. 4A and 4B, even in the case of virtual tiles TP12 of the same shape, the virtual tiles become virtual tiles having different structures by changing the layout of dithering threshold values. In the drawings, for the sake of explanation, only a portion of the layout of dithering values is depicted. The dithering values provided in the drawings show only that a virtual tile of different structure can be obtained by use of a different layout of dithering threshold values, and impose no limit at all on the invention.

Figure 5:
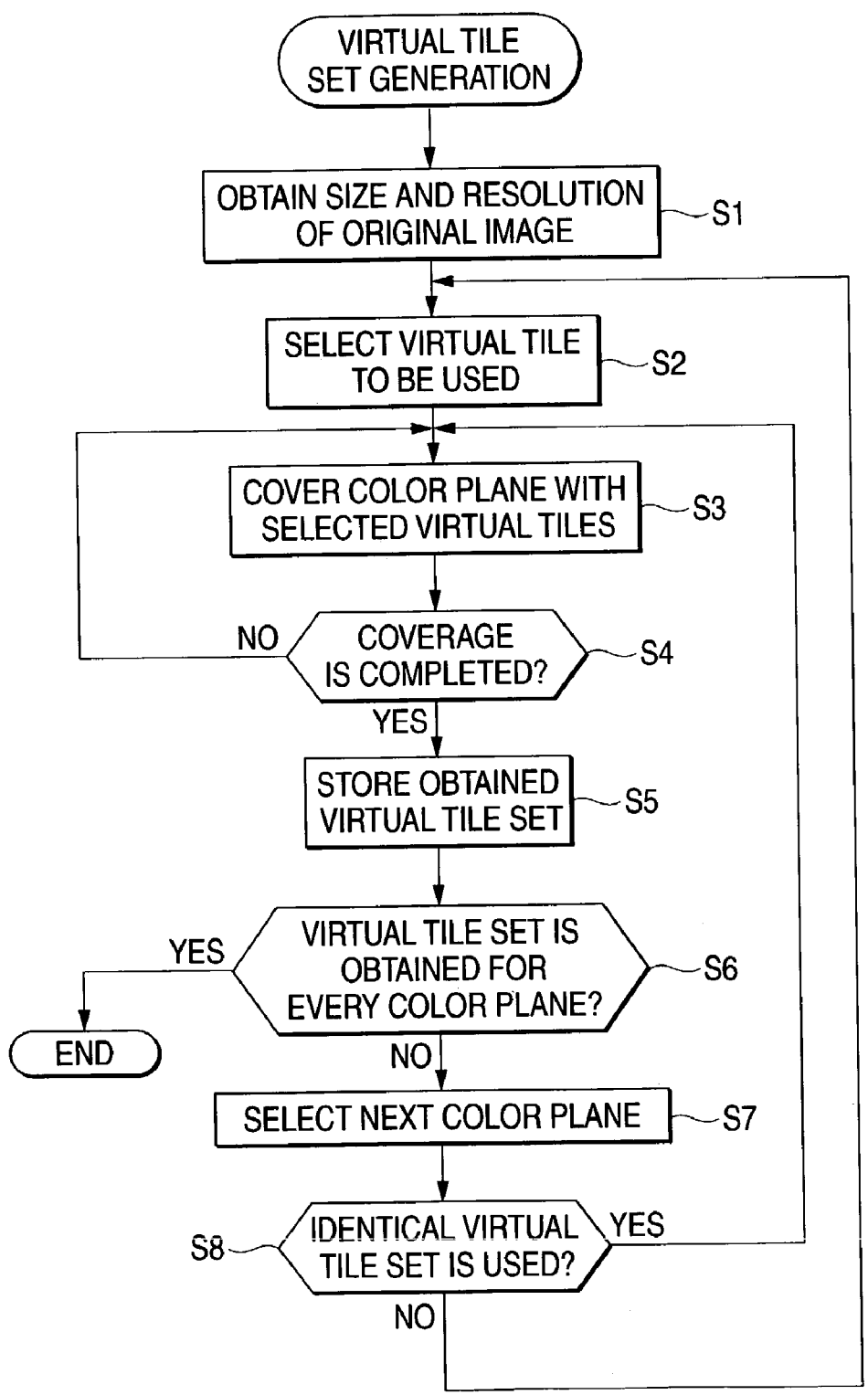
FIG. 5 is a flowchart showing processing for generating a virtual tile set.
Figure 6:
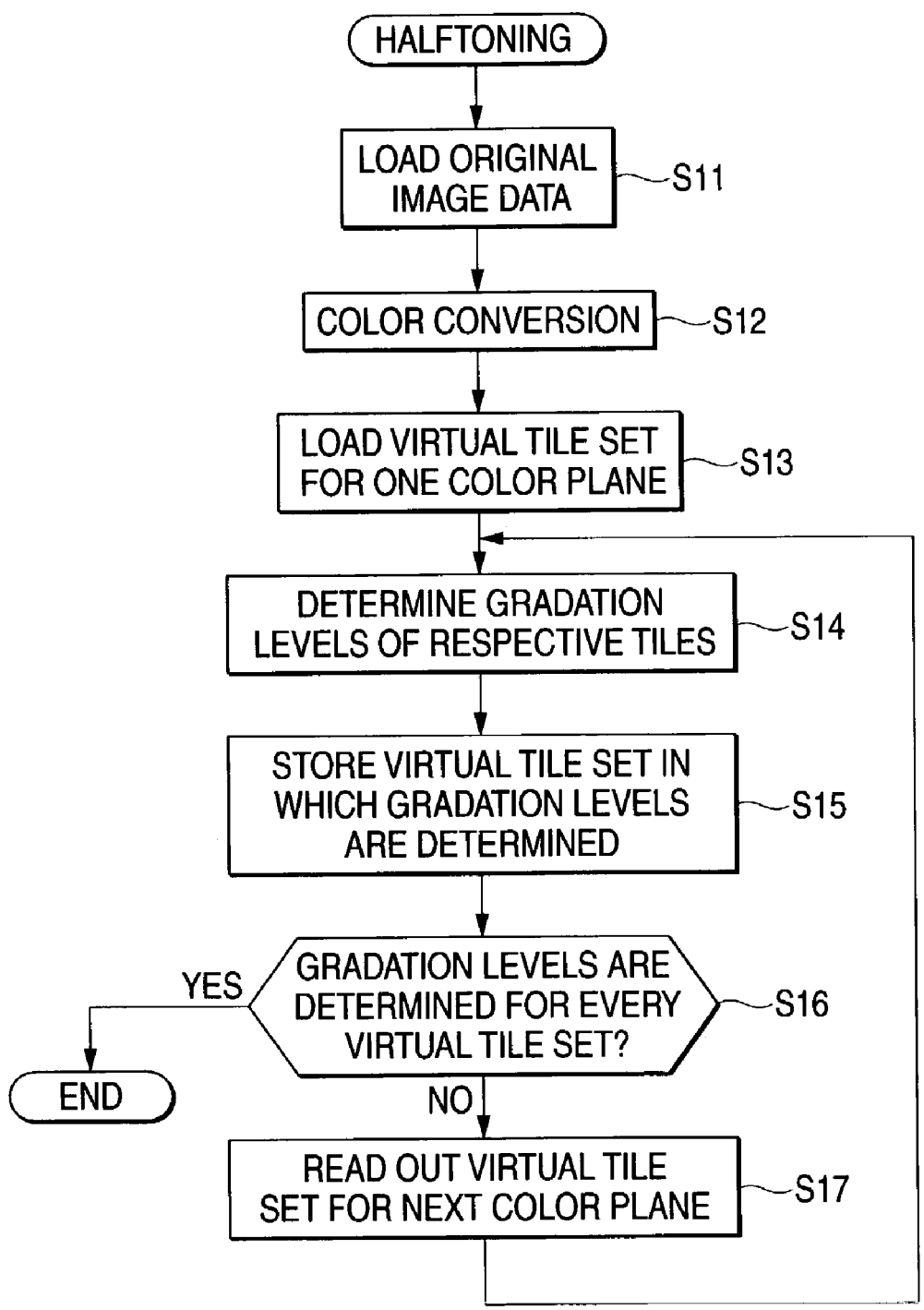
FIG. 6 is a flowchart showing halftoning.
Figure 7:
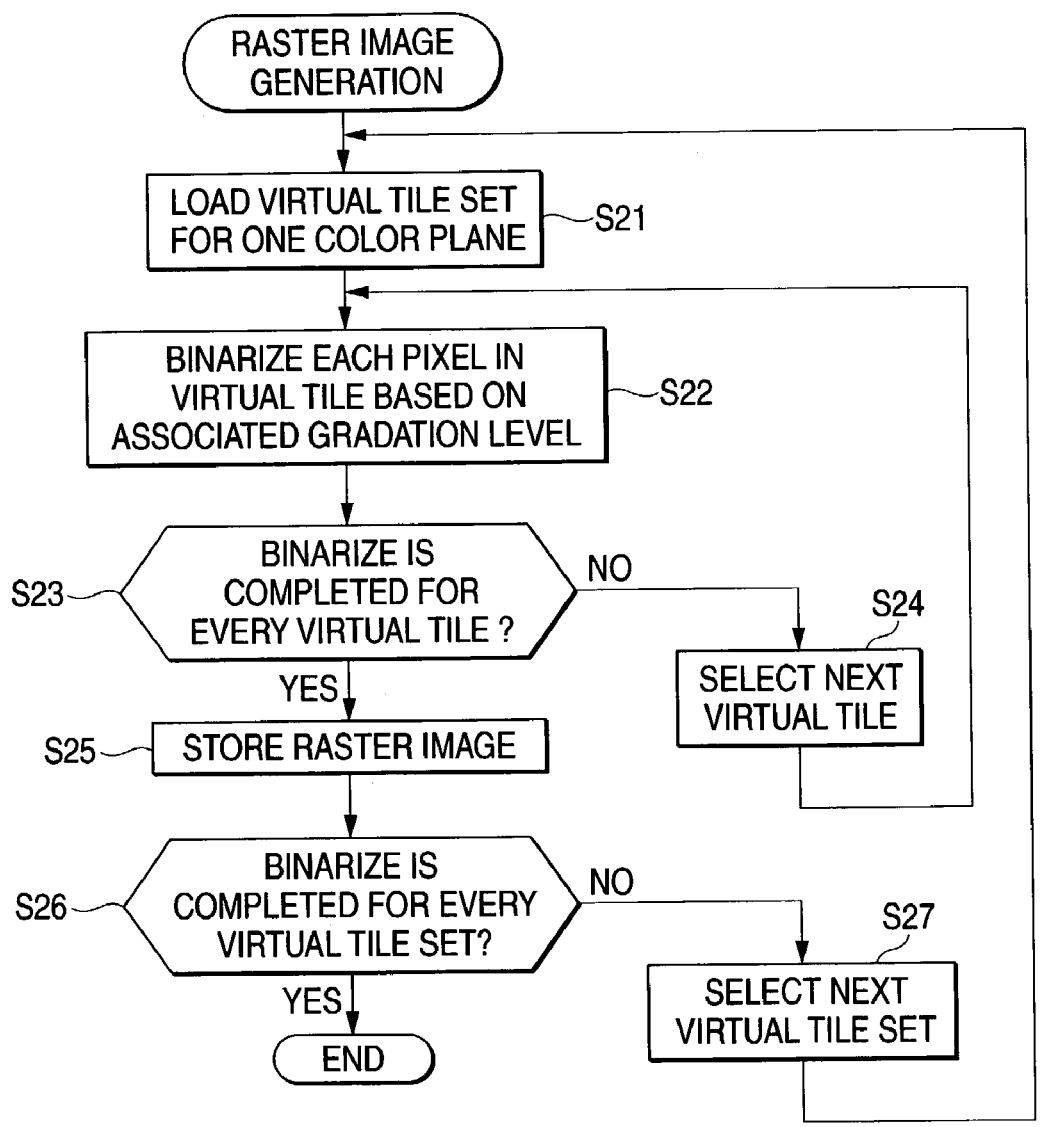
FIG. 7 is a flowchart showing processing for generating a raster image.

With reference to FIGS. 5 through 7, the operation of the embodiment will now be described. Throughout the drawings, a step is abbreviated as "S."

FIG. 5 is a flowchart showing the outline of virtual tile set generation processing to be performed by the virtual tile set generator 30.

First, the virtual tile set generator 30 acquires information about the size and resolution of an original image (step S1). In the subsequent processing, the virtual tile set generator 30 generates virtual tile sets to be used for covering respective CMYK color planes.

First, virtual tile sets to be used for a first color plane (e.g., a cyan) are selected. The thus-selected virtual tile sets are read from the virtual tile storage 20 (step S2). Next, a color plane is covered without any overlap or clearance by combination of the thus-selected virtual tile sets (steps S3, S4).

When coverage of the color plane with the virtual tile sets is completed (when YES is selected in step S4), the virtual tile sets are stored in memory (step S5). Next, a determination is made as to whether or not virtual tile sets have been generated for all the CMYK color planes (step S6). If there still remain color planes for which virtual tile sets have not been generated (when NO is selected in step S6), switching to the next color plane is effected (step S7). A determination is made as to whether or not a new color plane is to be covered by use of virtual tile sets identical with those which have been used thus far (step S8). When the same virtual tile set is to be used (when YES is selected in step S8), processing returns to the step S3. In contrast, when different virtual tile sets are to be used, processing returns to the step S2, where new virtual tile sets are selected. The thus-selected virtual tile sets are read from the virtual tile storage 20.

In this way, the virtual tile set generator 30 generates virtual tile sets to be used for virtually covering the respective color planes.

A single identical virtual tile set may be applied to all color planes, or different virtual tile sets may be applied to respective color planes. For instance, automatic adjustment may be performed in relation to whether a virtual tile set to be applied to respective color planes may be a single tile set or different tile sets, in accordance with the level of image quality required by a user, a print resolution, and the type of print paper.

Figure 12:
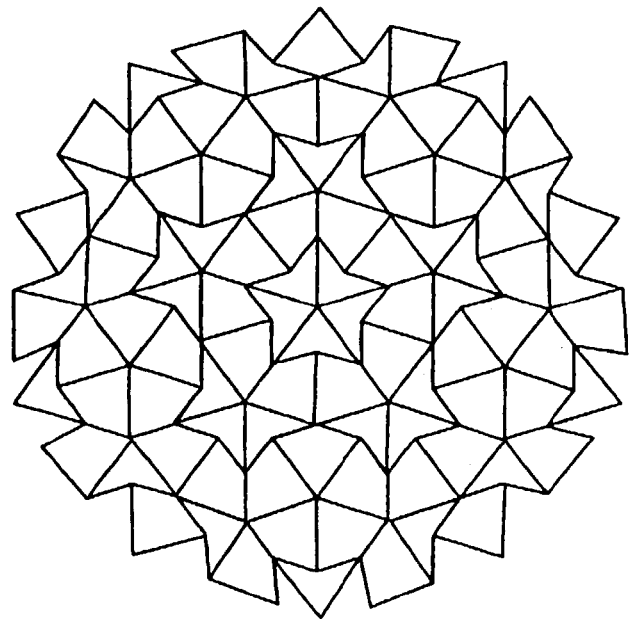
FIG. 12 is a descriptive view showing a state in which a plane is non-periodically covered by combination of the first through seven patterns.

Various methods may be employed as a method for generating a virtual tile set. For instance, a model of virtual tile set such as that shown in FIG. 12 is prepared beforehand. The model is fragmented in accordance with the size of an original image, thereby generating a virtual tile set corresponding to an original image.

Alternatively, virtual tile sets corresponding to a plurality of types of original image sizes (print sizes) may be prepared beforehand. A virtual tile set suitable for the size of an original image input to the image input section 10 may be loaded and used.

Moreover, when a plurality of original images are included in one print job, such as a case where a plurality of original images are to be processed continuously, a virtual tile set used for processing the first original image is stored in its present form, and the tile set may be again used for processing the next original image.

FIG. 6 is a flowchart showing the outline of halftoning to be performed by a halftone generator 40.

First, the halftone generator 40 loads from the image input section 10 data pertaining to an original image (step S11). Next, the data are subjected to color conversion to a CMYK color system (step S12). Then, a virtual tile set to be applied to a certain color plane (a color plane to be processed first) is loaded from the storage section (step S13). The virtual tile set is virtually superimposed on a color plane of the original image, thereby determining the gradation levels of respective virtual tiles (step S14). The virtual tile set for which the gradation levels have been set is stored in the storage section (step S15).

Likewise, the virtual tile set is switched, thereby determining gradation levels of respective virtual tiles (steps S16, S17). When gradation levels have been determined for all virtual tile sets to be applied to respective color planes (when YES is selected in step S16), processing is terminated.

FIG. 7 is a flowchart showing the outline of processing for generating a raster image to be performed by a raster image generator 50.

In the same manner as mentioned previously, a virtual tile set for a certain color plane is loaded from the storage section (step S21). On the basis of the gradation levels set for the respective virtual tiles of the virtual tile set, corresponding pixels located in the virtual tiles are binarized (steps S22 to S24). Specifically, pixels are binarized while virtual tiles are being switched (step S24) until all the virtual tiles constituting the virtual tile set are binarized (step S23).

The virtual tile that has finished undergoing binary-encoding is stored in the storage section (an image buffer) (step S25). Processing pertaining to the steps S21 through S25 is repeated while a virtual tile set is being switched (step S27) to another virtual tile set until all pixels of the entire virtual tile set finish undergoing binary-encoding (step S26). In this way, when raster images for respective color planes are generated, the print engine 60 forms raster images of print colors and transfers the images onto print paper.

In the embodiment, a virtual tile set is generated by combination of virtual tiles having different structures. Hence, in contrast with a related-art technique using halftone cells having the same shape, such as a rectangular shape, recursive appearance of identical patterns on a raster image can be inhibited. Further, there is employed a so-called Penrose tile which enables non-periodic coverage of a plane, thereby further preventing appearance of the same pattern and inhibiting occurrence of moiré fringes.

FIGS. 8A to 11 show an example in which a neighborhood of a certain point on a plane is covered with the Penrose-type virtual tiles TP11, TP12 shown in FIGS. 2A, 2B.

Figure 8A:
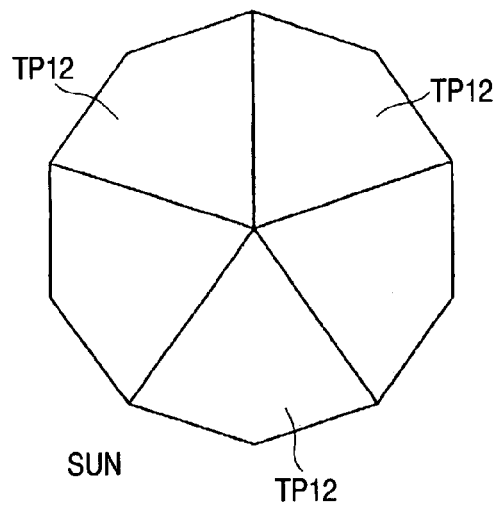
FIG. 8A is a descriptive view showing a first pattern to be used for covering the neighborhood of a certain point through use of virtual tiles.
Figure 8B:
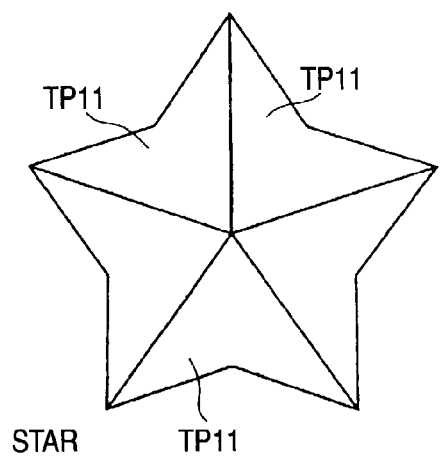
FIG. 8B is a descriptive view showing a second pattern to be used for covering the neighborhood of a certain point through use of virtual tiles.
Figure 9A:
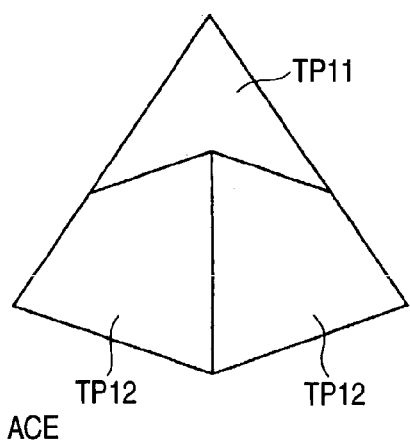
FIG. 9A is a descriptive view showing a third pattern to be used for covering the neighborhood of a certain point through use of virtual tiles.
Figure 9B:
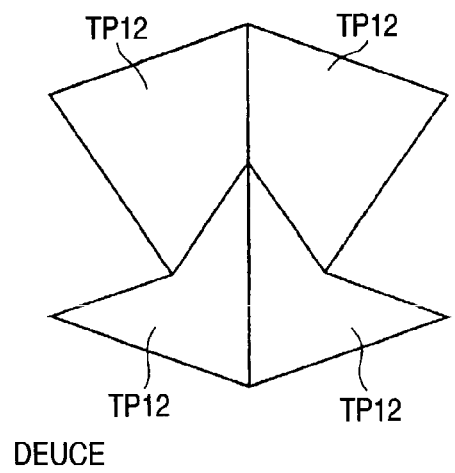
FIG. 9B is a descriptive view showing a fourth pattern to be used for covering the neighborhood of a certain point through use of virtual tiles.

FIG. 8A shows a pattern using five virtual tiles TP12, which pattern is called "SUN." FIG. 8B shows a pattern using five virtual tiles TP11, which pattern is called "STAR." FIG. 9A is a pattern using one virtual tile TP11 and two virtual tiles TP12, which pattern is called "ACE." FIG. 9B is a pattern using two virtual tiles TP11 and two virtual tiles TP12, which pattern is called "DEUCE."

Figure 10A:
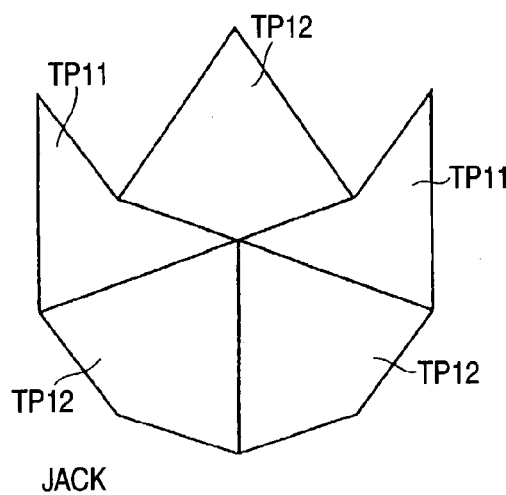
FIG. 10A is a descriptive view showing a fifth pattern to be used for covering the neighborhood of a certain point through use of virtual tiles.
Figure 10B:
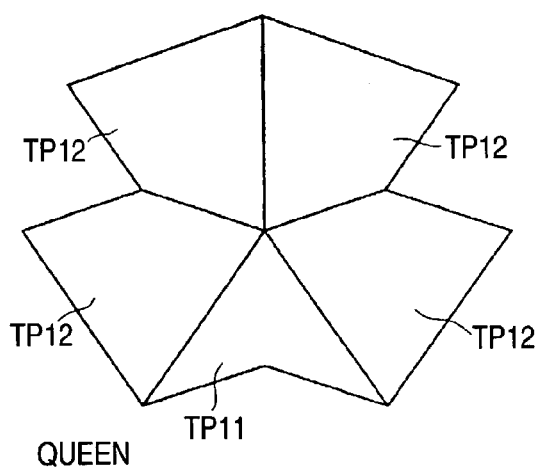
FIG. 10B is a descriptive view showing a sixth pattern to be used for covering the neighborhood of a certain point through use of virtual tiles.
Figure 11:
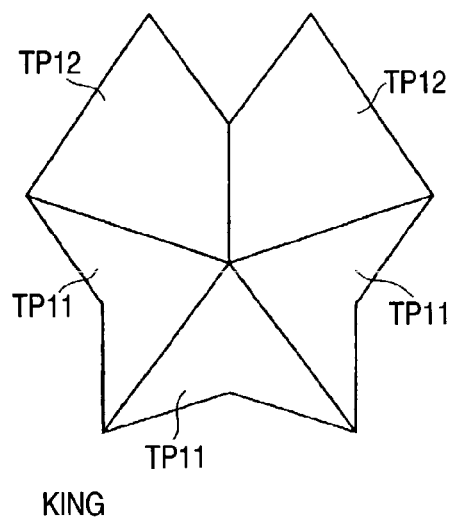
FIG. 11 is a descriptive view showing a seventh pattern to be used for covering the neighborhood of a certain point through use of virtual tiles.

FIG. 10A is a pattern using two virtual tiles TP11 and three virtual tiles TP12, which pattern is called a "JACK." FIG. 10B is a pattern using four virtual tiles TP12 and one virtual tile TP11, which pattern is called "QUEEN." FIG. 11 is a pattern using three virtual tiles TP 11 and two virtual tiles TP12, which pattern is called "KING."

As shown in FIG. 12, a plane can be non-periodically covered without any clearance or overlap by combination of the seven types of patterns described in connection with FIGS. 8A through 11.

Figure 13:
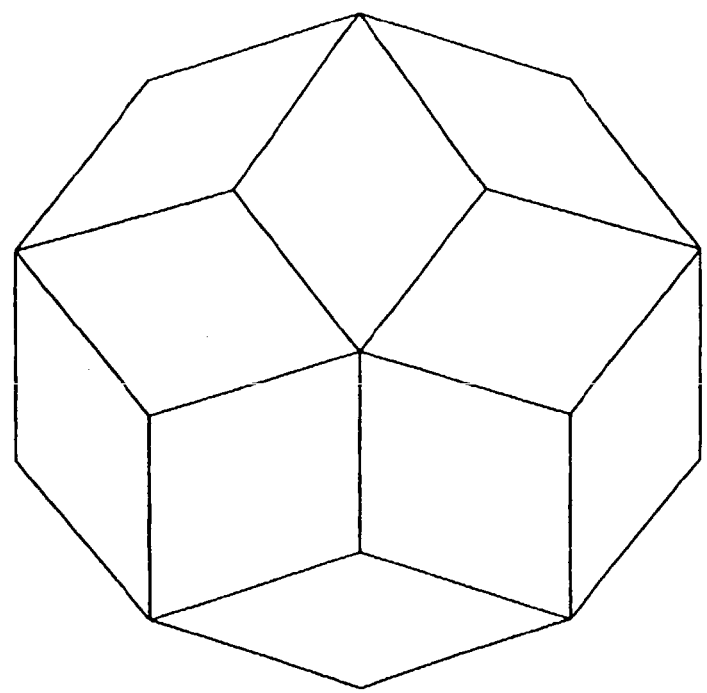
FIG. 13 is a descriptive view showing an example in which a plane is covered with virtual tiles of other Penrose types.
Figure 14A:
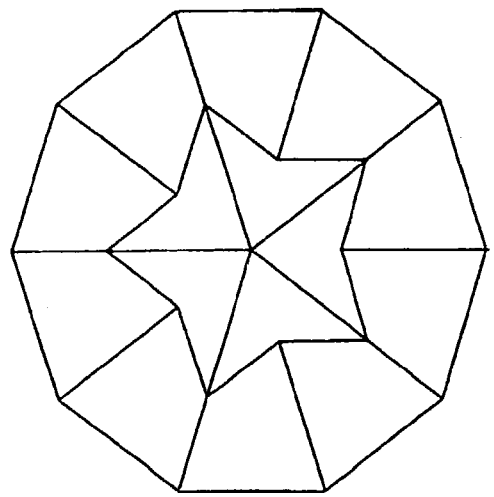
FIG. 14A is a descriptive view showing a dot pattern obtained at a gradation level of 0.
Figure 14B:
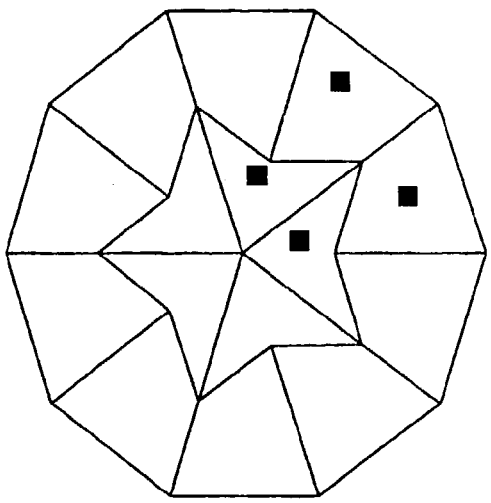
FIG. 14B is a descriptive view showing a dot pattern obtained at a gradation level of 1.
Figure 15A:
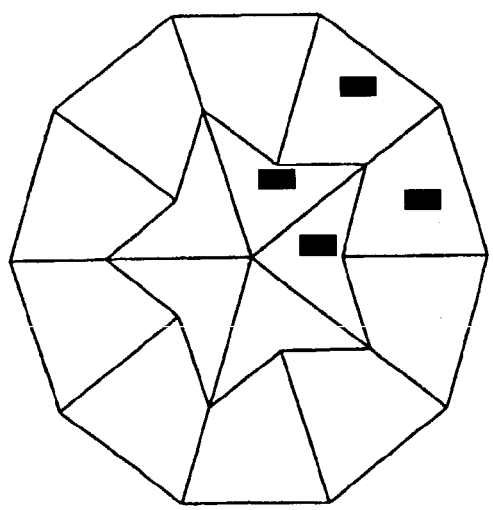
FIG. 15A is a descriptive view showing a dot pattern obtained at a gradation level of 2.
Figure 15B:
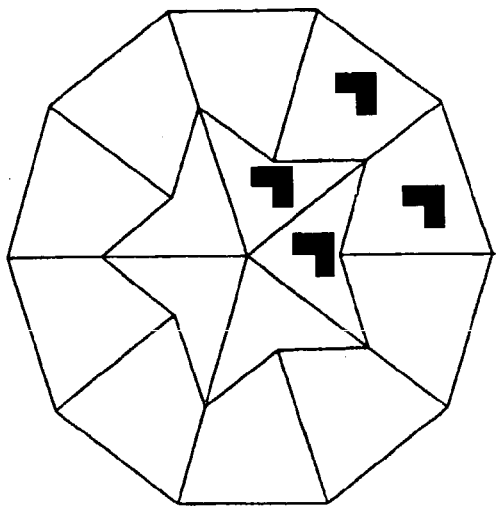
FIG. 15B is a descriptive view showing a dot pattern obtained at a gradation level of 3.
Figure 16A:
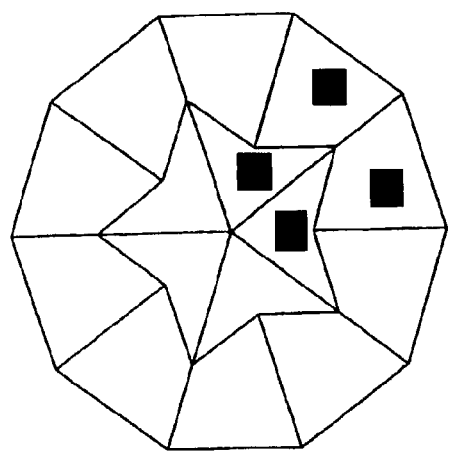
FIG. 16A is a descriptive view showing a dot pattern obtained at a gradation level of 4.
Figure 16B:
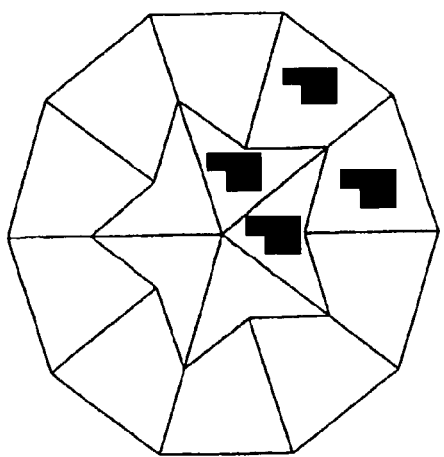
FIG. 16B is a descriptive view showing a dot pattern obtained at a gradation level of 5.

FIG. 13 shows a case where a plane is covered with virtual tiles TP21 and TP22 shown in FIGS. 2C, 2D. Even when there are employed the Penrose-type virtual tiles TP21, TP22 different from the tiles TP11, TP12, the plane can be non-periodically covered with the tiles.

FIGS. 14A through 22B show an example of growth of a dot pattern in accordance with the gradation level by employment of virtual tiles used as halftone cells.

The drawing shows growth of a gradation level from 0 to 17 one by one. For convenience of explanation, the range in which the halftone changes is expressed by 0 to 17. However, the invention is not limited to this range. For the sake of comprehension, growth of a dot pattern is provided for only a portion of virtual tiles.

Figure 17A:
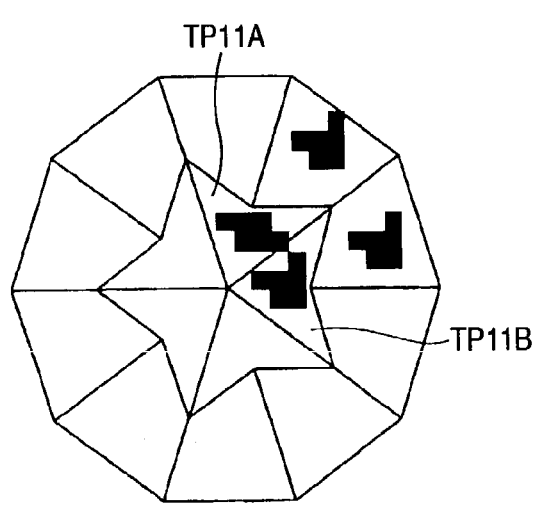
FIG. 17A is a descriptive view showing a dot pattern obtained at a gradation level of 6.
Figure 17B:
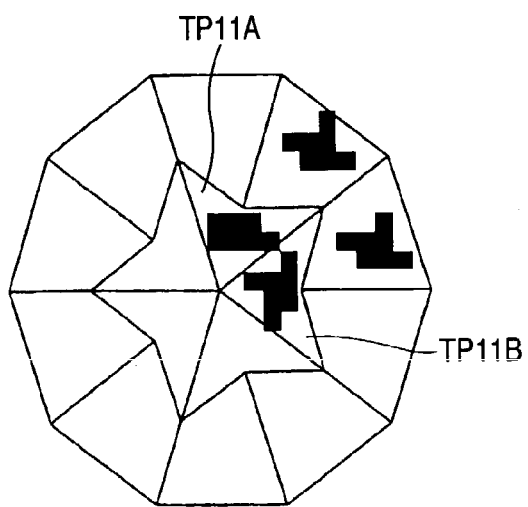
FIG. 17B is a descriptive view showing a dot pattern obtained at a gradation level of 7.
Figure 18A:
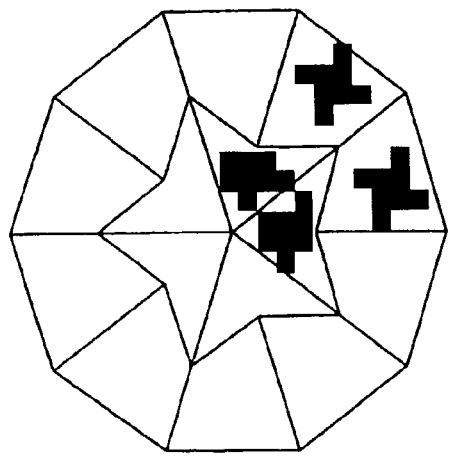
FIG. 18A is a descriptive view showing a dot pattern obtained at a gradation level of 8.
Figure 18B:
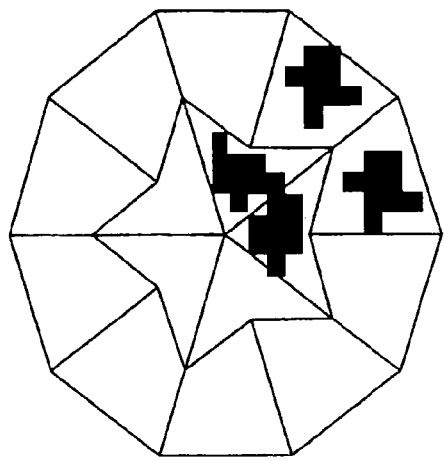
FIG. 18B is a descriptive view showing a dot pattern obtained at a gradation level of 9.
Figure 19A:
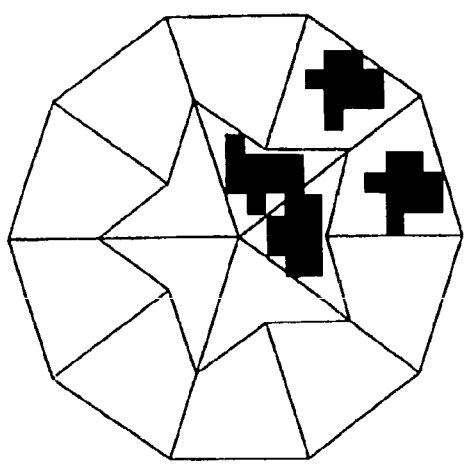
FIG. 19A is a descriptive view showing a dot pattern obtained at a gradation level of 10.
Figure 19B:
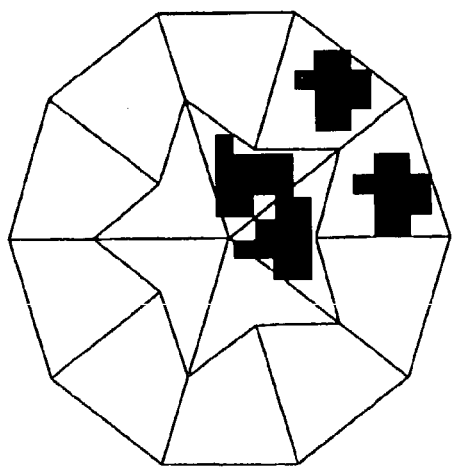
FIG. 19B is a descriptive view showing a dot pattern obtained at a gradation level of 11.
Figure 20A:
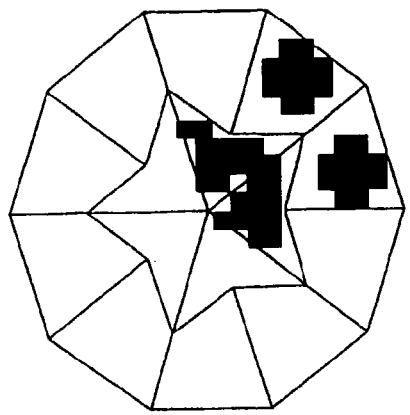
FIG. 20A is a descriptive view showing a dot pattern obtained at a gradation level of 12.
Figure 20B:
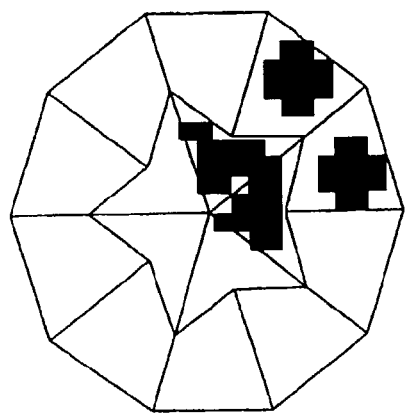
FIG. 20B is a descriptive view showing a dot pattern obtained at a gradation level of 13.
Figure 21A:
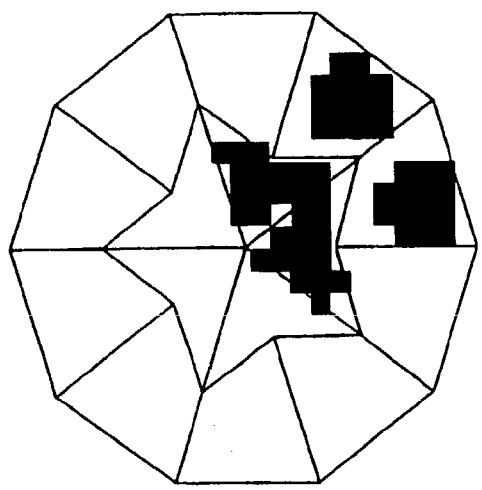
FIG. 21A is a descriptive view showing a dot pattern obtained at a gradation level of 14.
Figure 21B:
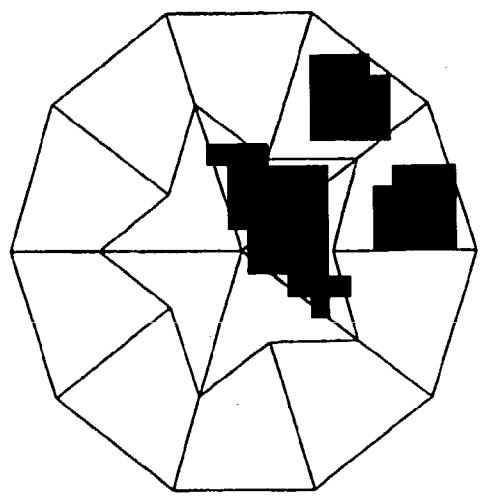
FIG. 21B is a descriptive view showing a dot pattern obtained at a gradation level of 15.
Figure 22A:
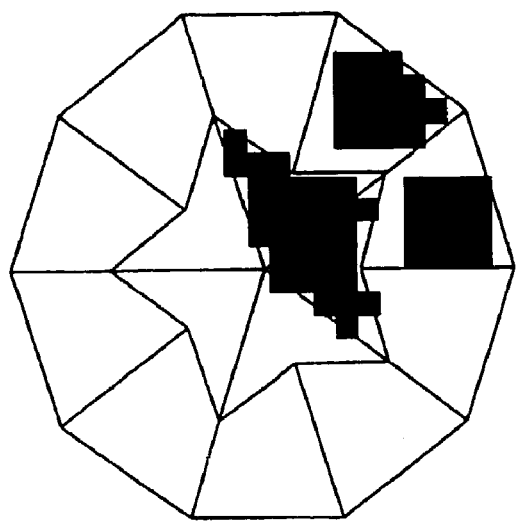
FIG. 22A is a descriptive view showing a dot pattern obtained at a gradation level of 16.
Figure 22B:
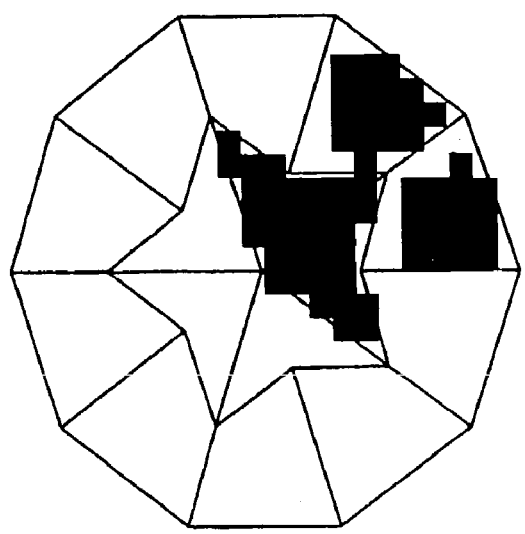
FIG. 22B is a descriptive view showing a dot pattern obtained at a gradation level of 17.

Growth of a dot pattern is determined by a method of arranging dithering threshold values. Growth of a dot pattern can be adjusted among adjacent virtual tiles. For instance, as shown in FIGS. 17A and 17B, even when identical virtual tiles TP11 assume the same gradation level, the dot patterns can be made different by adjustment, as in the case of tiles TP11A and TP11B. For instance, at a relatively low gradation level, dot patterns may be adjusted so as not to establish a link between dot patterns of adjacent virtual tiles.

Since the embodiment is constituted in the manner set forth, the following effect is yielded. First, a plurality of types of virtual tiles having different structures are used as halftone cells. An original image is virtually covered with the virtual tiles and subjected to halftoning. Hence, there can be inhibited appearance of an identical pattern, which would otherwise be caused at the time of generation of a raster image. Specifically, the embodiment solves a problem of moiré fringes appearing, which is a disadvantage of the dithering technique. Further, a chance of minute isolated dots being unstable is also avoided by the embodiment. Hence, a stable image can be obtained. In particular, the invention is preferable for use in electrophotography.

Penrose-type virtual tiles are used, and hence respective color planes of the original image can be non-periodically covered with the tiles. Repetition of an identical pattern is diminished, whereby the obtained image quality is improved further.

An applicable virtual tile set can be changed from one color plane to another. Hence, a virtual tile set can be generated in consideration of the quality required by the user, the performance of the print engine 60, and time required for printing.

Even in the case of virtual tiles of identical gradation level in an identical color plane, dot patterns of adjacent virtual tiles can be adjusted, thereby leading to a further improvement in the obtained image quality.

Figure 23:
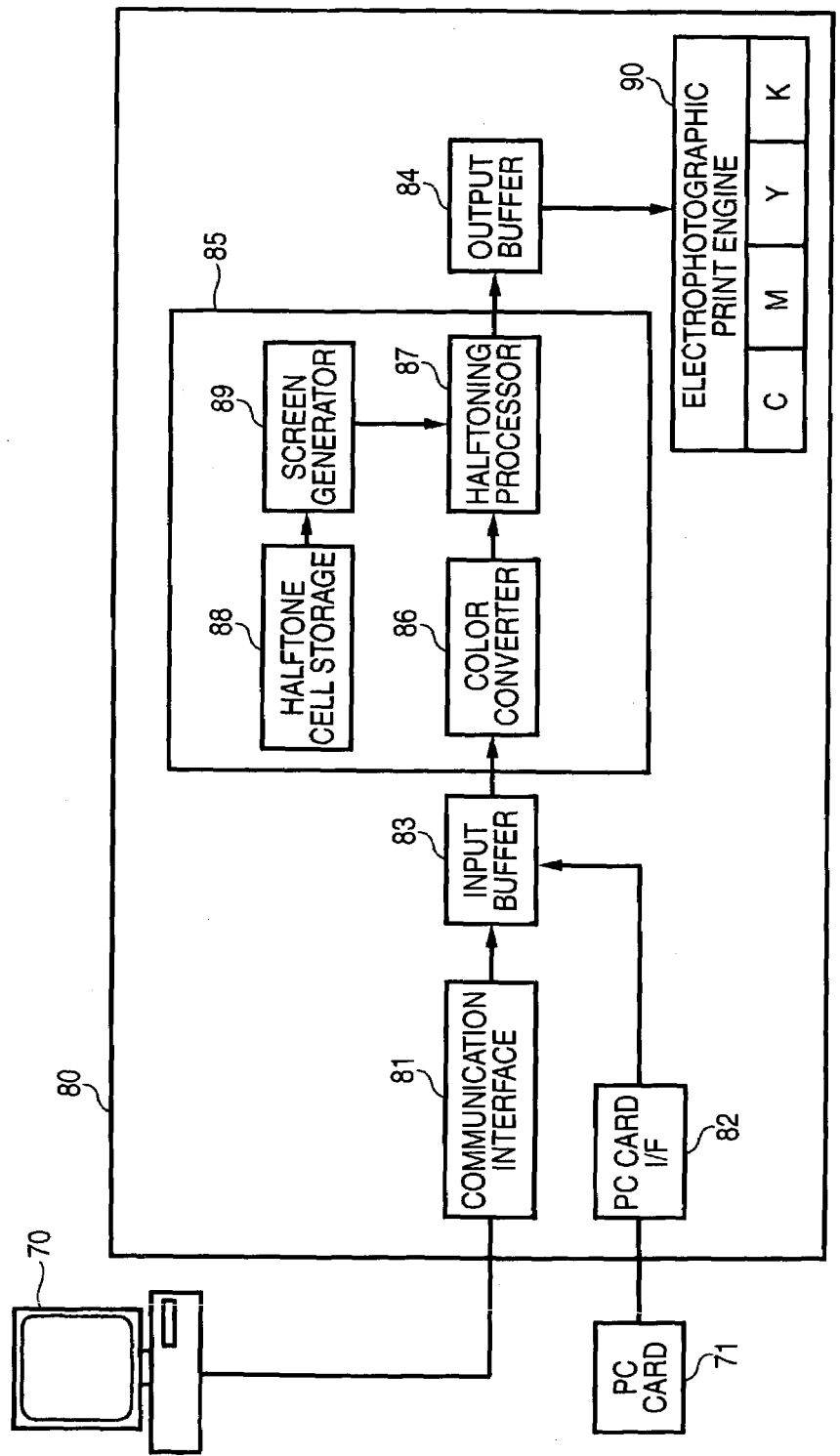
FIG. 23 is a block diagram showing the outline of an entire printer according to a second embodiment of the invention.

With reference to FIG. 23, a color laser printer according to a second embodiment of the invention will now be described.

A printer 80 which performs electrophotographic printing operation can receive an original image to be printed from a host computer 70 via a communication interface 81 or from a PC card 71 via a PC card interface 82. The printer 80 does not need to have both the interfaces 81 and 82. An original image can be input to the printer 80 via a digital camera or a scanner.

The printer 80 stores the thus-input original image into an input buffer 83. The original image held in the input buffer 83 is converted into a raster image by an image processor 85. The raster image is then written into an output buffer 84.

A print engine 90 reads the colors of raster images recorded in the output buffer 84 and prints the images through use of colors of image forming devices (the devices are constituted of photosensitive drums). The print engine 90 has a tandem configuration in which four image-forming devices of respective colors are connected in tandem with each other. Colors of images are subsequently printed on a print plane of print paper.

The image processor 85 has a color converter 86, a halftoning processor 87, a halftone cell storage 88, and a screen generator 89.

The color converter 86 converts an original image expressed in, e.g., an RGB color system into an image of CMYK color system. The halftoning processor 87 performs halftoning through use of a digital screen delivered from a screen generator 89.

In the same manner as stated in the first embodiment, one or more sets of Penrose-type halftone cells, which can non-periodically cover planes, are stored in advance in the halftone cell storage 88. Dithering threshold values corresponding to shapes are arranged in the respective halftone cells. The screen generator 89 generates colors of screens by combination of halftone cells read from the halftone cell storage 88.

Here, the screen generator 89 can generate a screen through use of any of at least three methods. A first method is to generate a screen by computation, every time printing is performed. A second method is to generate and store a screen on a per-print size basis in advance and to read a generated screen in accordance with a print size. A third method is to prepare screens to be used as models for several principal print sizes and to generate a screen to be used for printing from one model screen.

The printer prepares a raster image for printing purpose through use of non-periodic halftone cells. Accordingly, there is little chance of minute dots becoming unstable, which would be caused by the error diffusion technique. Conversely, as compared with the conventional dithering technique, periodic repetition is reduced, thereby inhibiting occurrence of moiré fringes. Accordingly, in particular, when the invention is used for the tandem-type print engine 90 in which positional accuracy (i.e., color registration) is difficult to increase, a deterioration in print quality can be prevented.

Figure 24:
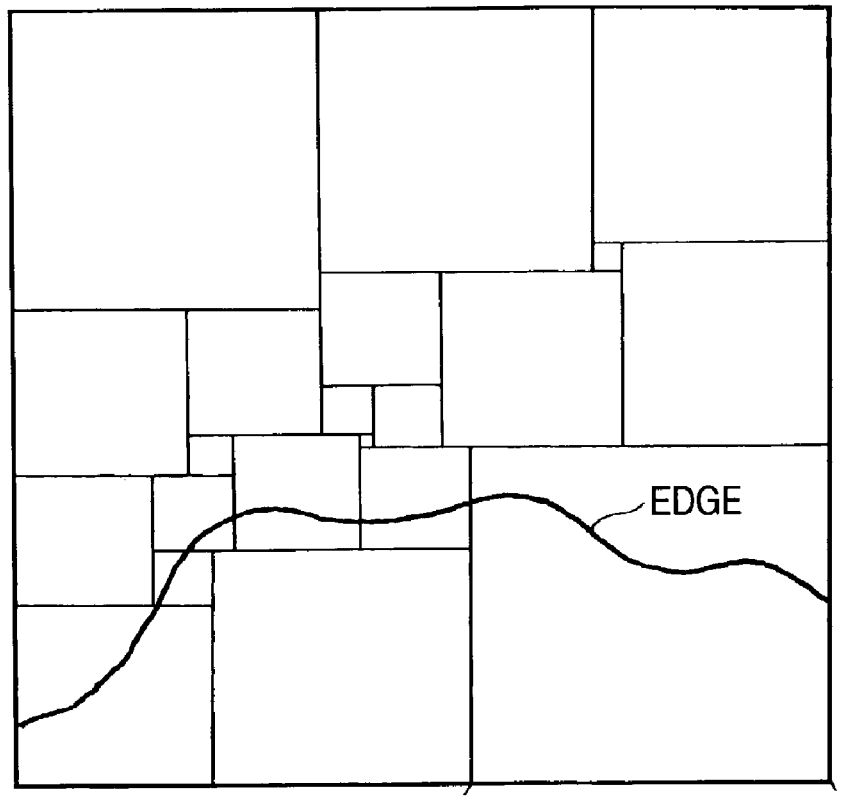
FIG. 24 is a descriptive view showing examples of virtual tiles employed in a third embodiment of the invention.
Figure 24:
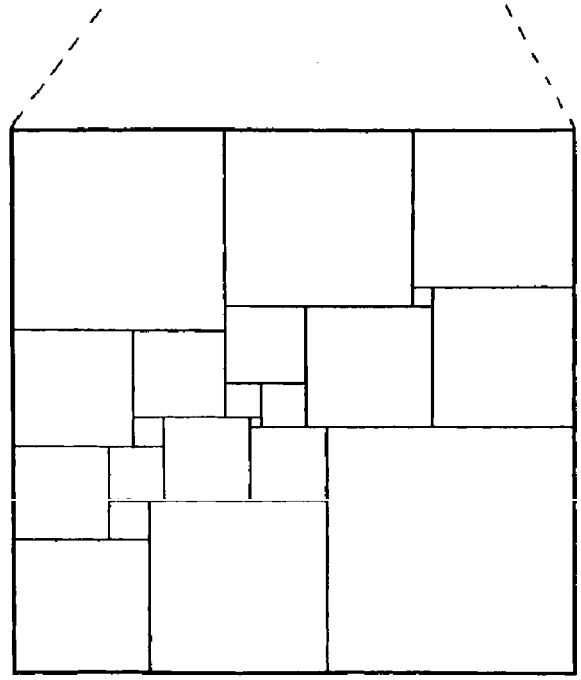

With reference to FIG. 24, a third embodiment of the invention will be described. This embodiment is characterized in that the entire surface of an original image is virtually covered with square virtual tiles of different sizes.

When the size of a virtual tile is larger than a predetermined value or when virtual tiles are allocated to an edge portion where a color tone or a density changes abruptly, the inside of the virtual tile can be further divided through use of a plurality of virtual tiles. In an illustrated example, a square virtual tile is divided into smaller squares (i.e., is divided in a fractal manner).

The size of a virtual tile covering an area of high-frequency component of the original image is reduced, thereby enabling performance of halftoning with higher image quality.

The invention is not limited to a case where a virtual tile is divided in a fractal manner. A virtual tile may be divided through use of a virtual tile having a shape different from that of the original virtual tile.

Figure 25:
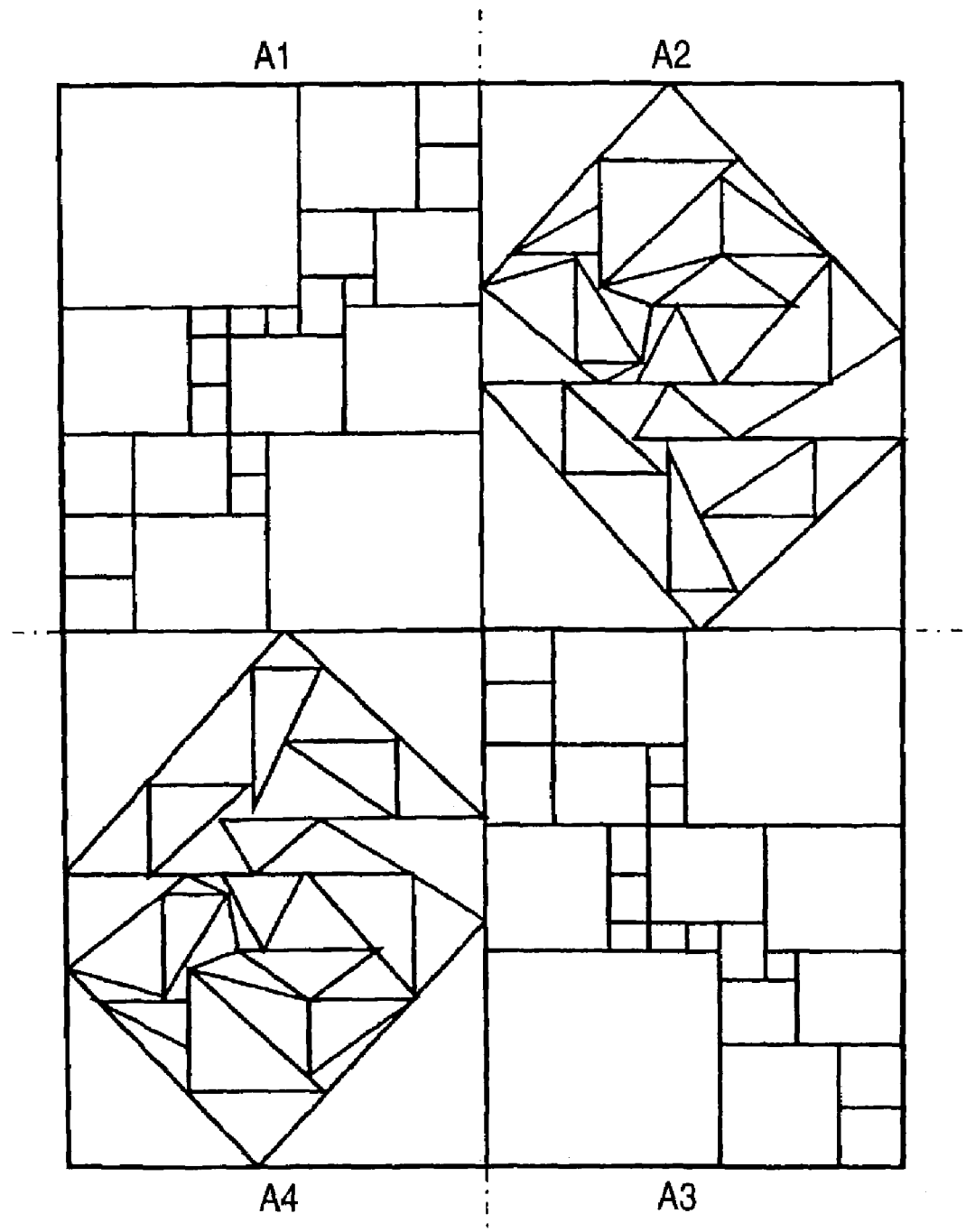
FIG. 25 is a descriptive view showing examples of virtual tiles employed in a fourth embodiment of the invention.

With reference to FIG. 25, a fourth embodiment of the invention will now be described. In the embodiment, an original image is divided into a plurality of areas, and the respective areas are covered with virtual tiles of different shapes or sizes.

Specifically, four areas A1 to A4 into which an original image is to be divided are covered with square or triangular virtual tiles. The types of virtual tiles adopted in the areas A1 through A4 can be determined in accordance with the characteristics of an original image; e.g., a color tone or presence/absence of an edge. Specifically, virtual tiles effective for regenerating edges are used for high-frequency portions of the original image. Virtual tiles effective for use with areas having a substantially uniform color tone are used for low-frequency portions of the original image.

With reference to FIGS. 26A to 29, a fifth embodiment of the invention will now be described. The embodiment is characterized in that the halftoning device is applied to a laser printer serving as an example of a printer capable of expressing multiple gradations and in that a conversion table for determining gradation levels of respective pixels is provided separately from a halftone cell.

Figure 26A:
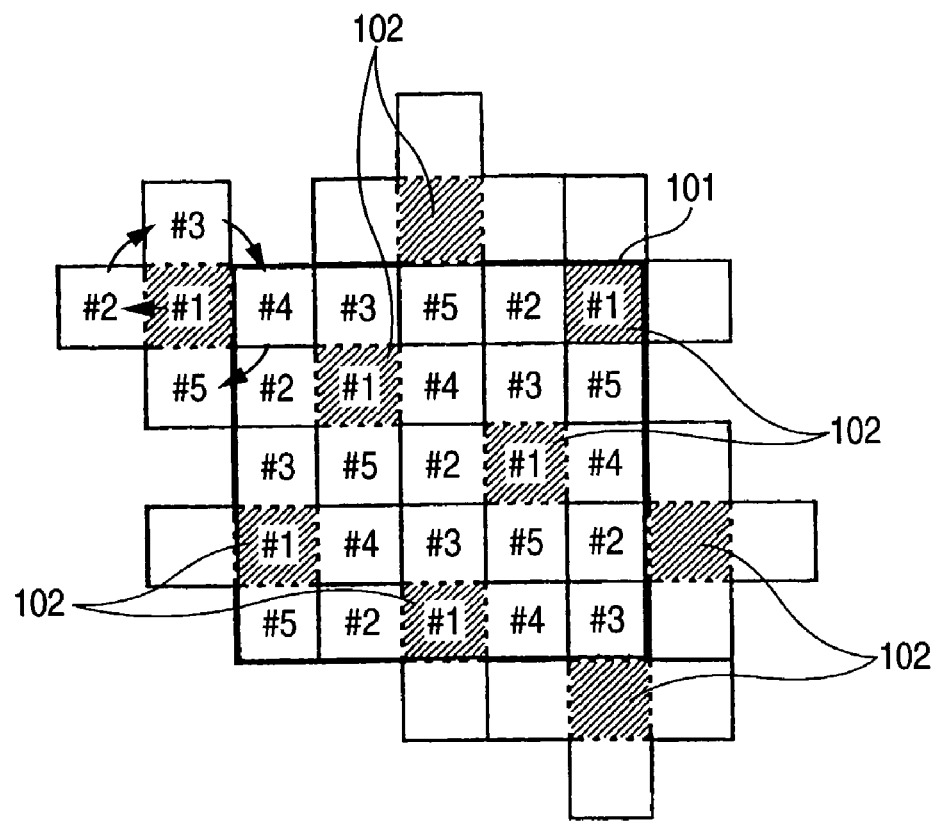
FIGS. 26A and 26B are descriptive views schematically showing the operating principle of a fifth embodiment of the invention.
Figure 26B:
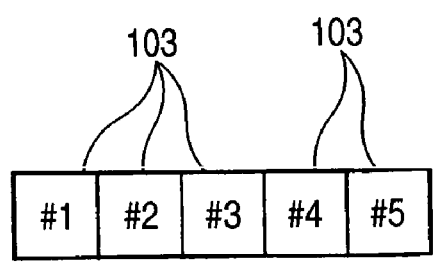

FIGS. 26A, 26B show a simple example of the principle of the invention employed in a case where a 5×5 pixel screen is employed. The screen 101 is employed as a foregoing virtual tile.

As shown in FIG. 26A, five pixels 102 serving as hatched growth nuclei are present in the 5×5 pixel screen 101 enclosed by a bold solid line. When the density of an image area corresponding to the 5×5 pixel screen 101 is 0%, all pixels including a growth nucleus 102 are blank. However, when the density increases to about 20%, dots are formed in only the locations of five growth nuclei 102. Moreover, when the density increases up to 40%, 60%, 80%, and 100%, dots are added to pixels located around the growth nuclei 102 appended #1 in sequence of #2, #3, #4, and #5, as indicated by arrows in the upper left portion of FIG. 26A. Here, for brevity, rough growth of a dot to be performed on a per-pixel basis is illustrated. However, on a practical screen, much finer growth of a dot can be performed on the basis of a unit smaller than one pixel. As illustrated, if about five growth nuclei 102 are present within the 5×5 pixel screen 101, there is achieved a sufficient halftoning effect which can be expected from the 5×5 pixel screen 101.

Preparation of five gamma conversion cells 103 such as those shown in FIG. 26B is sufficient for preparing the 5×5 pixel screen 101. Hence, the volume of screen data is reduced significantly.

Figure 27:
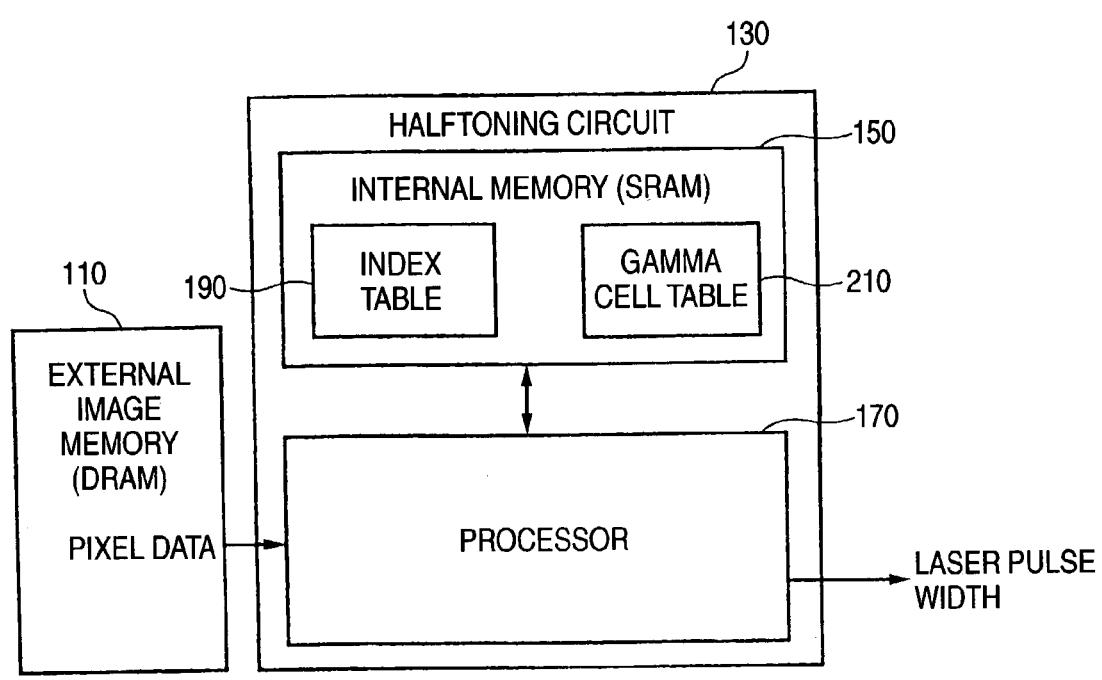
FIG. 27 is a block diagram showing the circuit configuration of the laser printer pertaining to FIG. 26.

As shown in FIG. 27, a halftoning circuit 130 provided in the laser printer has internal memory 150 using, e.g., SRAM; and a processor 170 embodied as a hardware logic circuit. Stored in the internal memory 150 are screen data which are made from two tables; that is, an index table 190 and a gamma cell table 210. The processor 170 loads gradation levels of respective pixels in an original continuous-tone image (typically, a single-color component value of one pixel is an 8-bit word) from external image memory 110 using, e.g., DRAM. With reference to the index table 190 and the gamma cell table 210, both being provided in the internal memory 150, the processor 170 determines the width of a laser pulse expressing a dot size corresponding to the loaded pixel value and outputs a signal having the laser pulse width. In accordance with the signal, an unillustrated laser print engine subjects a graphics-drawing laser pulse to pulse width modulation, thereby reproducing a virtually-continuous-tone image on paper through use of electrophotography.

Figure 28:
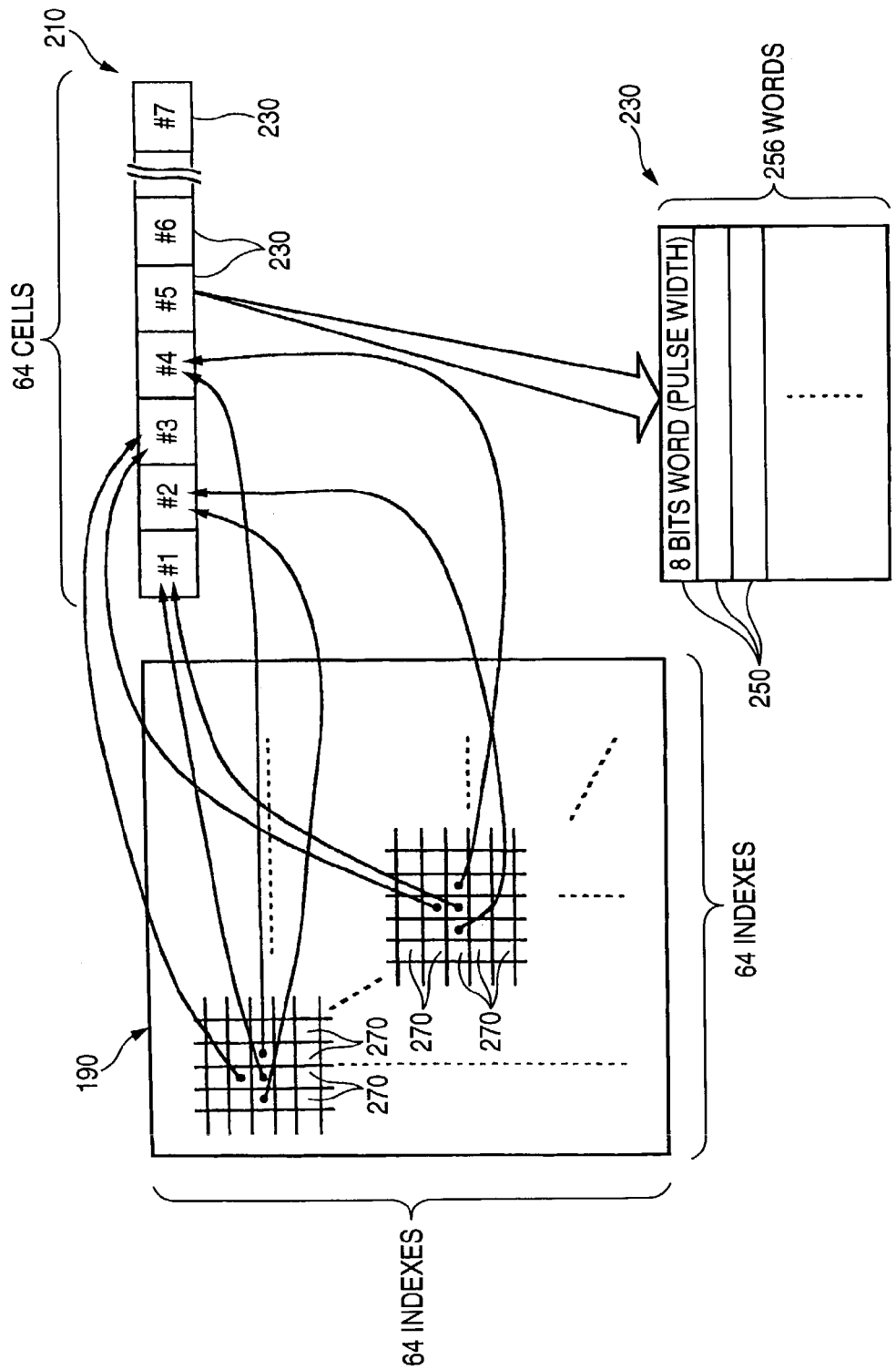
FIG. 28 is a descriptive view showing the configuration of screen data employed by the laser printer pertaining to FIG. 26.

FIG. 28 shows the configuration of the index table 190 and that of the gamma cell table 210.

The matrices 190, 210 express a screen of 64×64 pixel size. The gamma cell table 210 has 64 gamma conversion cells 230. Each gamma conversion cell 230 can be assigned to each pixel. Each gamma conversion cell 230 stores 256 laser-pulse-width values (8-bit words) 250 corresponding to 256 gradation levels that can be assumed by the gradation level of each pixel in the original image (i.e., an 8-bit word of a single-color component). The 64 gamma conversion cells 230 are assigned cell numbers #1, #2, . . . #64, such as those shown in the drawing. The gamma cell table 210 expresses a growth pattern of a dot in the area formed from 64 pixels centering on one growth nucleus. According to the growth pattern, as the density of an image gradually increases from zero, a first dot serving as a growth nucleus appears in a pixel corresponding to the cell numbered #1.

Subsequently, dots grow to pixel regions corresponding to other cells in sequence of #2, #3, . . . #64 with the growth nucleus being taken as a starting point.

The index table 190 is formed from 64×64 indexes 270 corresponding to 64×64 pixel regions on the original image. The respective indexes 270 correspond to respective pixels provided within the 64×64 pixel regions. A cell number assigned to one gamma conversion cell 230 in the gamma cell table 210 is stored in each index 270 (a six-bit word is theoretically sufficient as a cell number; however, an 8-bit word is employed when the invention is implemented). As indicated by the arrows shown in the drawing, each index 270 specifies one gamma conversion cell 230 within the gamma cell table 210.

The 64×64 indexes 270 provided in the index table 190 recursively specify the 64 gamma conversion cells 230 provided in the gamma cell table 210 in a predetermined sequence pattern in which 64 growth nuclei are located in a dispersed manner within the corresponding 64×64 pixel regions and in which dots grow with the 64 growth nuclei being taken as centers in association with an increase in the density of an image. This is in principle identical with the cells 103 shown in FIG. 26B being recursively applied to respective pixels located in 5×5 pixel regions 70 shown in FIG. 26A in sequence of #4, #3, #5, #2, #1. In this way, the 64 growth nuclei are located within the 64×64 pixel regions, and hence a halftoning effect which can be expected through use of the 64×64 pixel screen can be sufficiently achieved.

Here, the volume of data pertaining to the gamma cell table 210 is determined as 8 (bits)×256 (words)×64 (cells) =131 kb. Moreover, the volume of data pertaining to the index table 190 is determined as 8 (bits)×[64×64 (indexes)] =32 kb. A total volume of the data is 164 kb. The volume of the data is much smaller than the volume of conventional screen data pertaining to the same pixel size; that is, 8 Mb.

Figure 29:
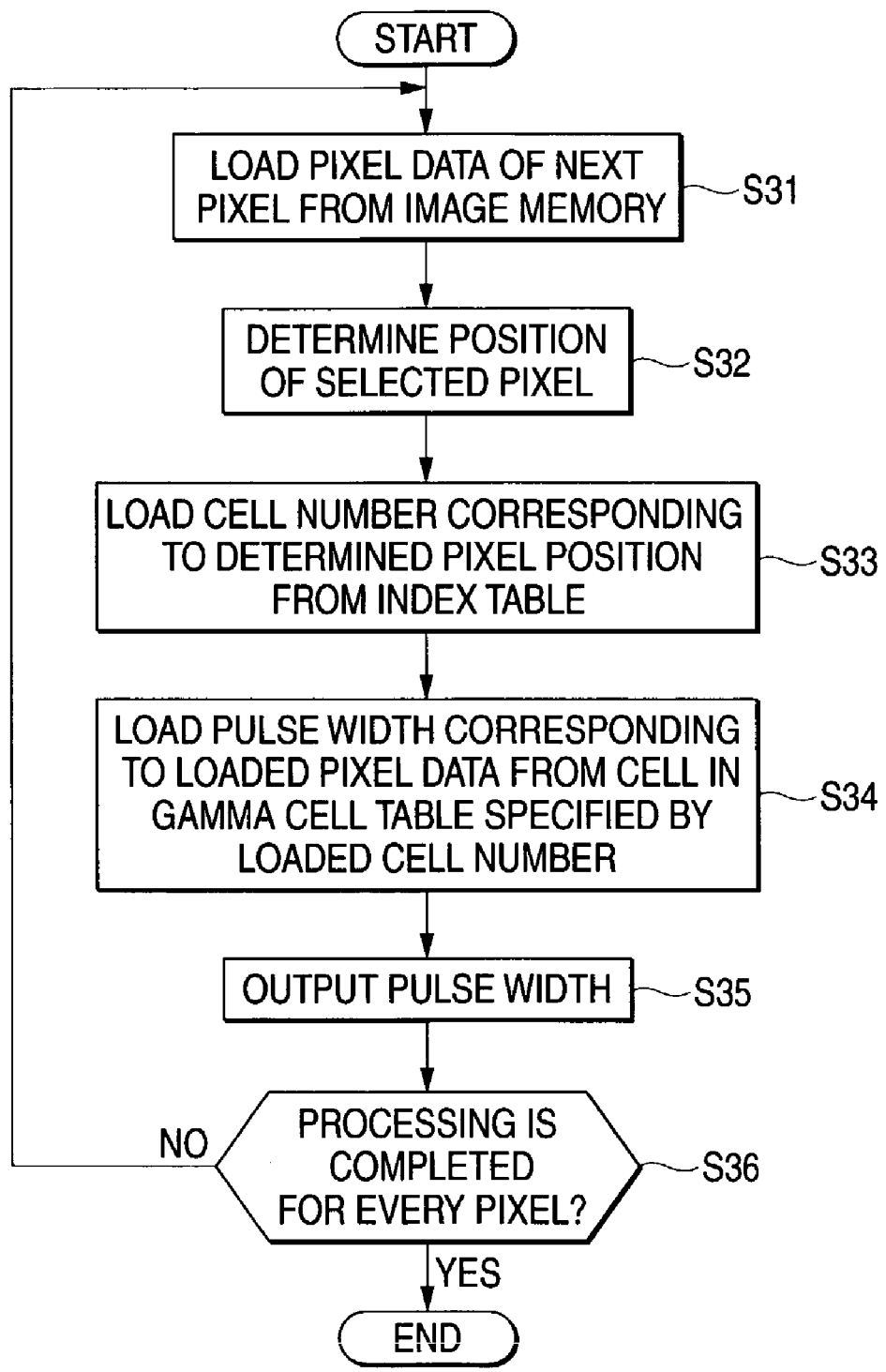
FIG. 29 is a flowchart showing operation of a processor of the laser printer pertaining to FIG. 26.

FIG. 29 shows operation of the processor 170 of the halftoning circuit 130.

First, a pixel value of a certain pixel located within the original image is loaded from the image memory 110 (step S31). Next, the position of that pixel within the 64×64 pixel region is determined (step S32). A cell number is read from an index 270 in the index table 190 corresponding to the position of the pixel (step S33). A laser pulse width value corresponding to the pixel value read in the step S31 is loaded from one gamma conversion cell 230 within the gamma cell table 210 specified by the cell number (step S34). The thus-loaded pulse width value is output (step S35). In accordance with the pulse width value, an unillustrated laser print engine subjects to pulse width modulation a graphics-drawing laser to be used for rendering a dot at the position of the pixel. The foregoing operations are iterated for all pixels provided in the original image (step S36).

In relation to the halftoning screen, an optical dot growth pattern changes in accordance with the type of an image (e.g., text such as characters or symbols, graphics such as a line and a figure, or a natural image such as a photograph or a painting), in accordance with whether an original image is color or monochrome, and in accordance with preferences of the user. For this reason, the user can also select an appropriate one from a plurality of types of screens in accordance with the type of an image. Various techniques to be used for realizing selection of screens are conceivable. By way of example, the following technique can be adopted. Specifically, as shown in FIG. 27, a plurality of index tables 190, which specify cells within the gamma matrix 210 in such a sequence pattern that unique, different dot growth patterns are made, are prepared in the internal memory 130. Unique screen numbers are assigned in advance to the respective index tables 190. In the case of a color original image, gradation values of respective pixels of an original image are formed from three to four color components such as RGB, CMY, or CMYK (usually each color component is embodied as an 8-bit word). Further, a screen number (formed from e.g., an 8-bit word) is also included in the pixel data as an additional component. For instance, a screen number of an index table 190 which is optimal for printing text is included in pixel data of the pixels located in, e.g., a text region of the image. Moreover, a screen number of an index table 190 optimal for printing a natural image is included in pixel data of the pixels located within a natural image region. As a result, various screens can be selectively used without involvement of an increase in the volume of data.

Here, a person skilled in the art can implement various additions, modifications, and combinations within the scope of the invention described in connection with the embodiments.

Figure 30:
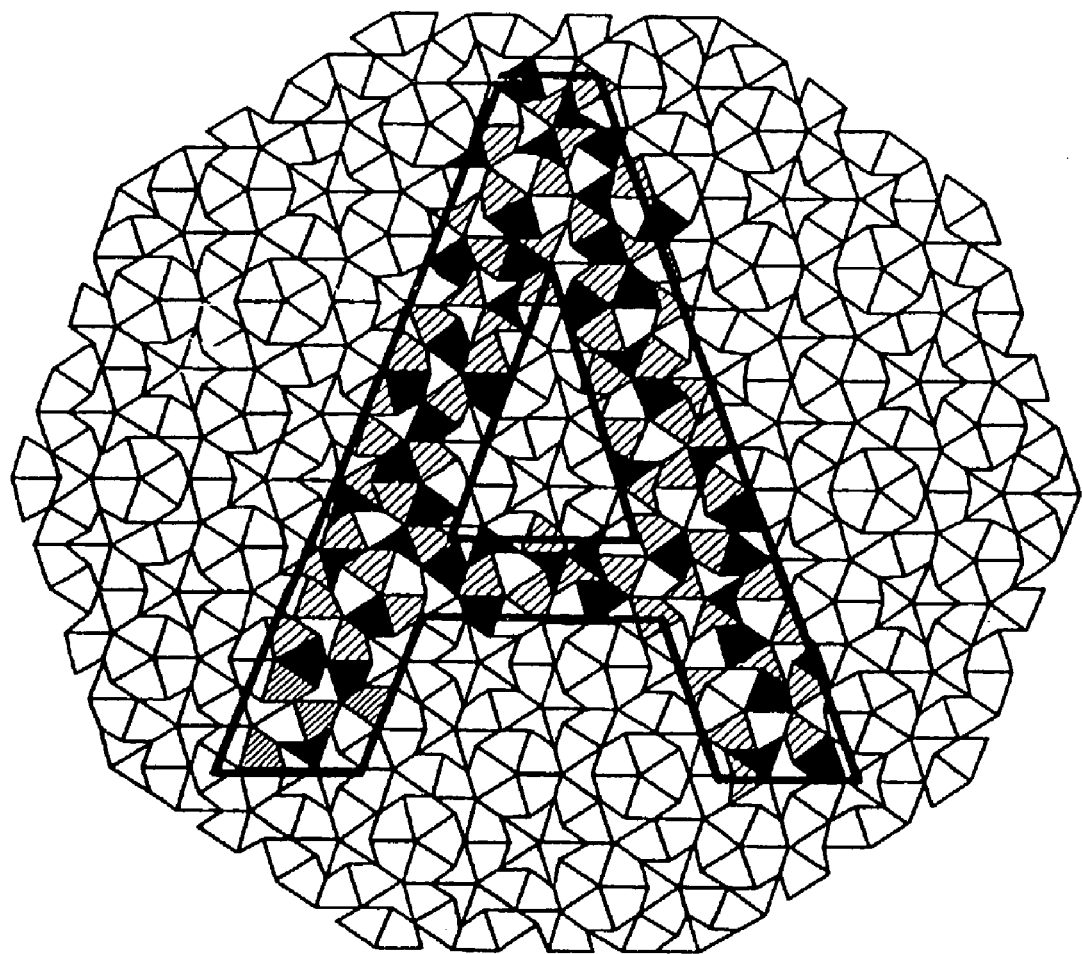
FIG. 30 is a descriptive view showing a modification of the invention obtained when the invention is applied to a display device.

For instance, the embodiments have described the halftoning device to be used primarily for an electrophotographic apparatus. However, as can be seen from a modification shown in FIG. 30, the invention can also be applied to a display device such as a liquid-crystal display. Character "A" is outlined with bold solid lines at the center of FIG. 30. Virtual tiles located within the character "A" can be colored in RGB colors. Specifically, the virtual tiles shown in FIG. 30 are formed as non-rectangular elements (light-emitting elements of Penrose tile type) to be used for illuminating RGB colors. By illuminating predetermined virtual tiles, both a color image and a monochrome image can be expressed.

What is claimed is:

1. A halftoning processor, comprising:
   a storage, which stores therein a plurality of areal gradation arrays respectively having different shapes or sizes from one another;
   a coverage performer, which selects and combines ones of the areal gradation arrays to virtually cover an original image having multiple gradation levels with the selected and combined areal gradation arrays; and
   a gradation level determinant, which determines a gradation level of each pixel which is associated with one of the selected and combined areal gradation arrays, based on a setting value defined in each of the areal gradation arrays,
   wherein the coverage performer selects and combines at least two kinds of the areal gradation arrays having different shapes.

2. The halftoning processor as set forth in claim 1, wherein the coverage performer divides a predetermined one of the selected and combined areal gradation arrays to cover the divided areal gradation array with a plurality of sub-areal gradation arrays.

3. The halftoning processor as set forth in claim 1, further comprising a reference pattern storage, which previously stores therein at least one size-based reference pattern which is composed of the areal gradation arrays according to at least one size of the original image,
   wherein the coverage performer covers the original image with the areal gradation arrays based on the reference pattern.

4. The halftoning processor as set forth in claim 1, wherein the coverage performer covers respective color planes constituting the original image with an identical set of the areal gradation arrays.

5. The halftoning processor as set forth in claim 1, wherein the coverage performer covers respective color planes constituting the original image with different sets of the areal gradation arrays.

6. The halftoning processor as set forth in claim 1, wherein the coverage performer covers at least one of color planes constituting the original image with a set of the areal gradation arrays which is different from a set of the areal gradation arrays used for covering remaining one of the color planes.

7. A halftoning processor, comprising:
means for inputting color original image having multiple gradation levels;
a virtual tile storage, which previously stores therein a plurality of virtual tiles respectively having different shapes or sizes from one another;
a virtual tile set generator, which selects and combines ones of the virtual tiles to generate a virtual tile set which is capable of covering each of color planes constituting the color original image with the selected and combined virtual tiles;
a gradation level determinant, which determines a gradation level of each of the virtual tiles; and
a raster image generator, which converts each pixel which is associated with one of the selected and combined virtual tiles provided with the determined gradation level, into a raster image in accordance with characteristic of an image output device.

8. A halftoning processor, comprising:
means for inputting color original image having multiple gradation levels;
a virtual tile storage, which stores therein a plurality of virtual tiles which are capable of non-periodically covering a plane without any overlap or clearance;
a virtual tile set generator, which selects and combines ones of the virtual tiles to generate a virtual tile set which is capable of covering each of color planes constituting the color original image with the selected and combined virtual tiles without any overlap or clearance;
a gradation level determinant, which determines a gradation level of each of the virtual tiles; and
a raster image generator, which converts each pixel which is associated with one of the selected and combined virtual tiles provided with the determined gradation level, into a raster image in accordance with characteristic of an image output device.

* * * * *